US012666326B2

(12) United States Patent
Veijalainen et al.

(10) Patent No.: US 12,666,326 B2
(45) Date of Patent: Jun. 23, 2026

(54) MACHINE LEARNING IN RADIO CONNECTION MANAGEMENT

(71) Applicant: Nokia Technologies Oy, Espoo (FI)

(72) Inventors: Teemu Veijalainen, Helsinki (FI); Stephen Mwanje, Dorfen (DE); Janne Ali-Tolppa, Taufkirchen (DE); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 757 days.

(21) Appl. No.: 18/013,946

(22) PCT Filed: Sep. 16, 2020

(86) PCT No.: PCT/EP2020/075799
§ 371 (c)(1),
(2) Date: Dec. 30, 2022

(87) PCT Pub. No.: WO2022/002422
PCT Pub. Date: Jan. 6, 2022

(65) Prior Publication Data
US 2023/0292198 A1     Sep. 14, 2023

(30) Foreign Application Priority Data
Jul. 3, 2020     (WO) ................. PCT/EP2020/068752

(51) Int. Cl.
*H04B 17/318*          (2015.01)
*H04W 36/00*          (2009.01)
(Continued)

(52) U.S. Cl.
CPC ...... *H04W 36/0085* (2018.08); *H04B 17/318* (2015.01); *H04W 36/08* (2013.01); *H04W 36/247* (2023.05)

(58) Field of Classification Search
CPC ....... H04W 36/0083; H04W 36/00833; H04W 36/00835; H04W 36/00837;
(Continued)

(56) References Cited

U.S. PATENT DOCUMENTS

2009/0196254 A1*   8/2009   Cha ................... H04W 36/0064
                                                           370/332
2012/0044836 A1*   2/2012   Sivavakeesar ........ H04W 24/02
                                                           370/255
(Continued)

FOREIGN PATENT DOCUMENTS

EP      3354067 A1      8/2018
EP      3496454 A1      6/2019
EP      3503620 A1      6/2019

OTHER PUBLICATIONS

Ericsson, "On further aspects pf early measurement," 3GPP TSG-RAN WG2#107bis, R2-1912547, Chongqing, China, Oct. 14-18, 2019.
(Continued)

*Primary Examiner* — Matthew W Genack
(74) *Attorney, Agent, or Firm* — Barta Jones, PLLC

(57)          ABSTRACT

This document discloses a solution for performing exploration of radio resource management actions. According to an aspect, a method in a terminal device includes: receiving configuration information from a network node of a radio access network; entering, in response to the configuration information and in a state of not having a need to transfer data, an exploration mode where a reduced set of radio connection functions are enabled compared with a default operating mode; triggering, in the exploration mode, an explorative handover from a source cell managed by the network node to a target cell; establishing a radio connection with a target network node as a result of the explorative handover to the target cell managed by the target network
(Continued)

node; acquiring measurement data of the radio connection and transmitting the measurement data to the target network node.

7 Claims, 13 Drawing Sheets

(51) Int. Cl.
*H04W 36/08* (2009.01)
*H04W 36/24* (2009.01)

(58) Field of Classification Search
CPC ....... H04W 36/00838; H04W 36/0085; H04W 36/0088; H04W 36/0094; H04W 36/08; H04B 17/30; H04B 17/309; H04B 17/318
See application file for complete search history.

(56) References Cited

U.S. PATENT DOCUMENTS

| | | | | |
|---|---|---|---|---|
| 2015/0181492 | A1* | 6/2015 | Schmidt | H04W 36/302 |
| | | | | 455/436 |
| 2015/0373754 | A1* | 12/2015 | Wu | H04W 24/02 |
| | | | | 370/329 |
| 2018/0317145 | A1 | 11/2018 | Melin et al. | |
| 2019/0053324 | A1* | 2/2019 | Tseng | H04W 76/30 |
| 2020/0314949 | A1* | 10/2020 | Jung | H04W 68/00 |
| 2022/0232659 | A1* | 7/2022 | Kim | H04W 76/28 |

OTHER PUBLICATIONS

Orange, "Self-optimization use case: self-tuning of handover parameters," 3GPP TSG SA WG5 & Ran WG3 LTE Adhoc, R3-071262, Sophia Antipolis, France, Jun. 13-14, 2007.

* cited by examiner

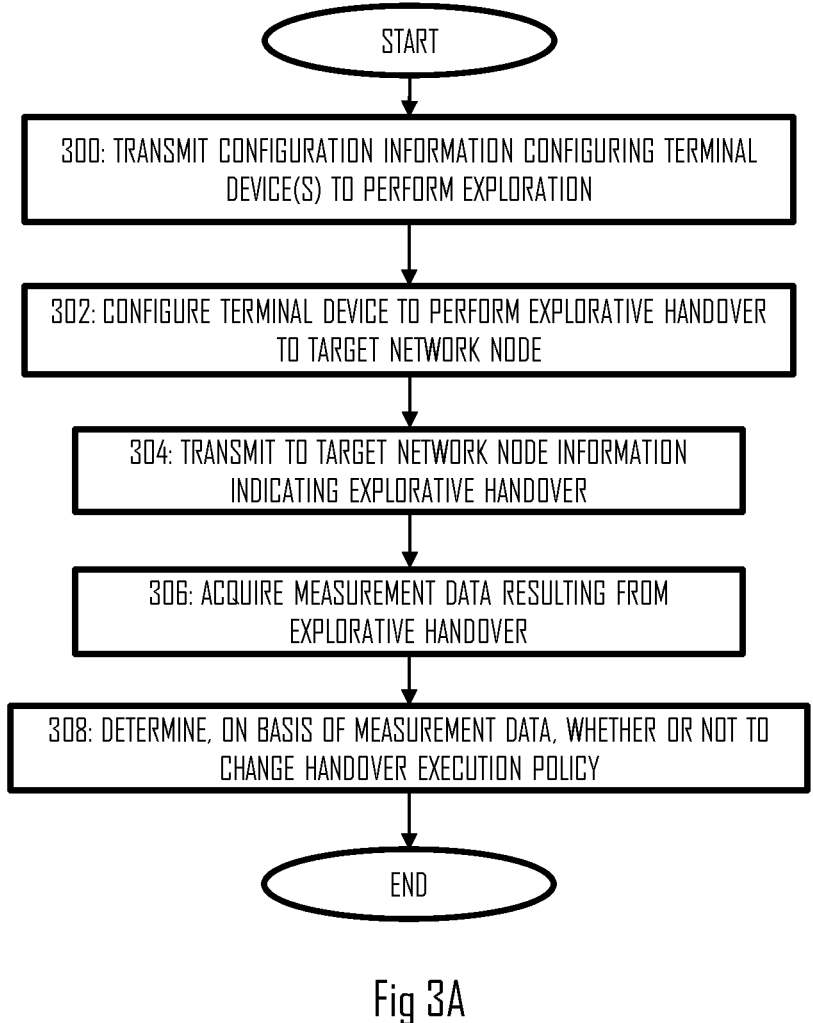

START

300: TRANSMIT CONFIGURATION INFORMATION CONFIGURING TERMINAL DEVICE(S) TO PERFORM EXPLORATION

302: CONFIGURE TERMINAL DEVICE TO PERFORM EXPLORATIVE HANDOVER TO TARGET NETWORK NODE

304: TRANSMIT TO TARGET NETWORK NODE INFORMATION INDICATING EXPLORATIVE HANDOVER

306: ACQUIRE MEASUREMENT DATA RESULTING FROM EXPLORATIVE HANDOVER

308: DETERMINE, ON BASIS OF MEASUREMENT DATA, WHETHER OR NOT TO CHANGE HANDOVER EXECUTION POLICY

END

Fig 3A

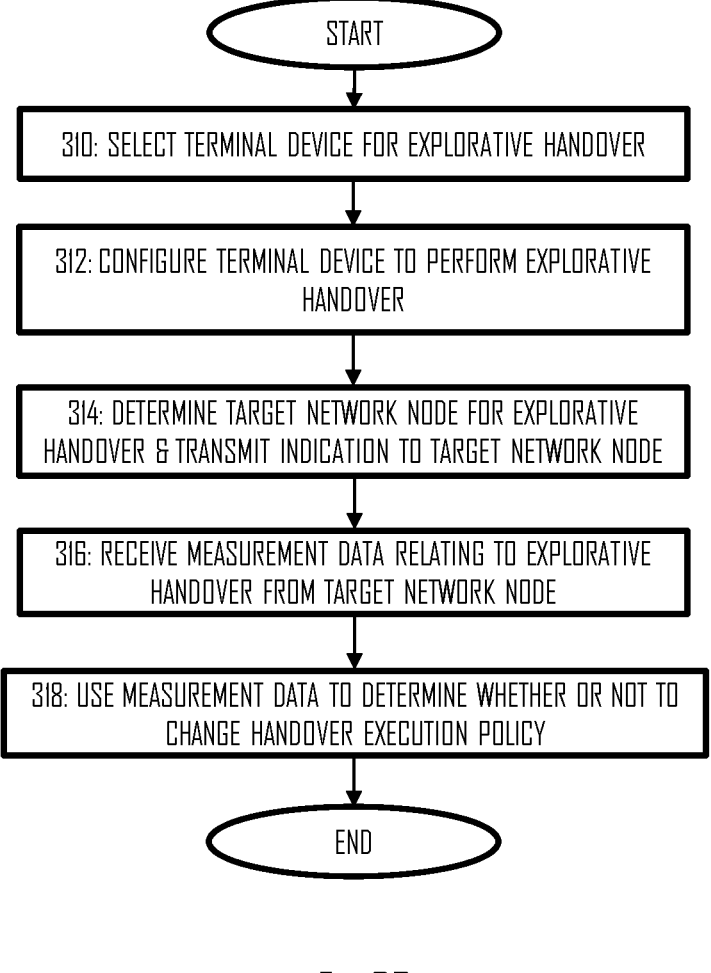

START

310: SELECT TERMINAL DEVICE FOR EXPLORATIVE HANDOVER

312: CONFIGURE TERMINAL DEVICE TO PERFORM EXPLORATIVE HANDOVER

314: DETERMINE TARGET NETWORK NODE FOR EXPLORATIVE HANDOVER & TRANSMIT INDICATION TO TARGET NETWORK NODE

316: RECEIVE MEASUREMENT DATA RELATING TO EXPLORATIVE HANDOVER FROM TARGET NETWORK NODE

318: USE MEASUREMENT DATA TO DETERMINE WHETHER OR NOT TO CHANGE HANDOVER EXECUTION POLICY

END

Fig 3B

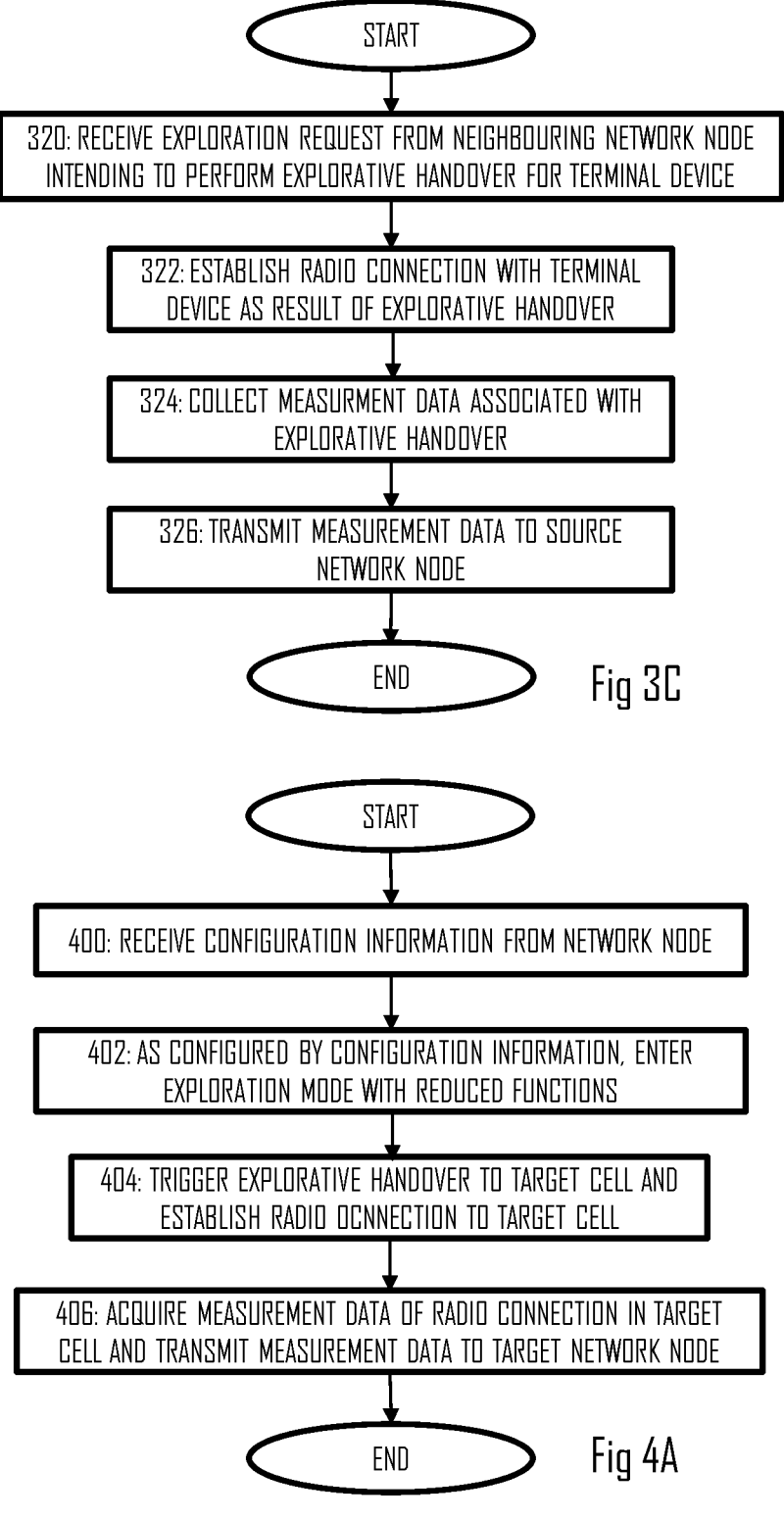

START

320: RECEIVE EXPLORATION REQUEST FROM NEIGHBOURING NETWORK NODE INTENDING TO PERFORM EXPLORATIVE HANDOVER FOR TERMINAL DEVICE

322: ESTABLISH RADIO CONNECTION WITH TERMINAL DEVICE AS RESULT OF EXPLORATIVE HANDOVER

324: COLLECT MEASURMENT DATA ASSOCIATED WITH EXPLORATIVE HANDOVER

326: TRANSMIT MEASUREMENT DATA TO SOURCE NETWORK NODE

END

Fig 3C

START

400: RECEIVE CONFIGURATION INFORMATION FROM NETWORK NODE

402: AS CONFIGURED BY CONFIGURATION INFORMATION, ENTER EXPLORATION MODE WITH REDUCED FUNCTIONS

404: TRIGGER EXPLORATIVE HANDOVER TO TARGET CELL AND ESTABLISH RADIO OCNNECTION TO TARGET CELL

406: ACQUIRE MEASUREMENT DATA OF RADIO CONNECTION IN TARGET CELL AND TRANSMIT MEASUREMENT DATA TO TARGET NETWORK NODE

END

Fig 4A

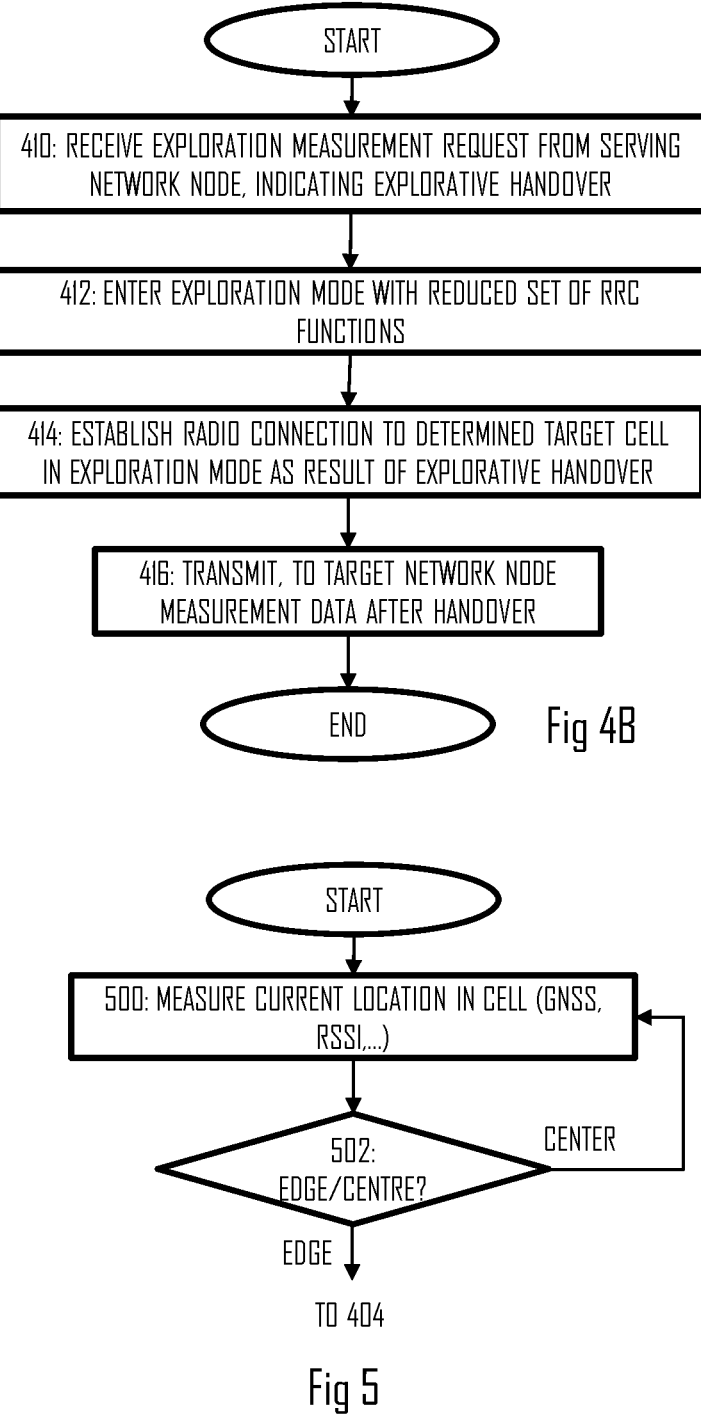

START

410: RECEIVE EXPLORATION MEASUREMENT REQUEST FROM SERVING NETWORK NODE, INDICATING EXPLORATIVE HANDOVER

412: ENTER EXPLORATION MODE WITH REDUCED SET OF RRC FUNCTIONS

414: ESTABLISH RADIO CONNECTION TO DETERMINED TARGET CELL IN EXPLORATION MODE AS RESULT OF EXPLORATIVE HANDOVER

416: TRANSMIT, TO TARGET NETWORK NODE MEASUREMENT DATA AFTER HANDOVER

END    Fig 4B

START

500: MEASURE CURRENT LOCATION IN CELL (GNSS, RSSI,...)

502: EDGE/CENTRE?    CENTER

EDGE

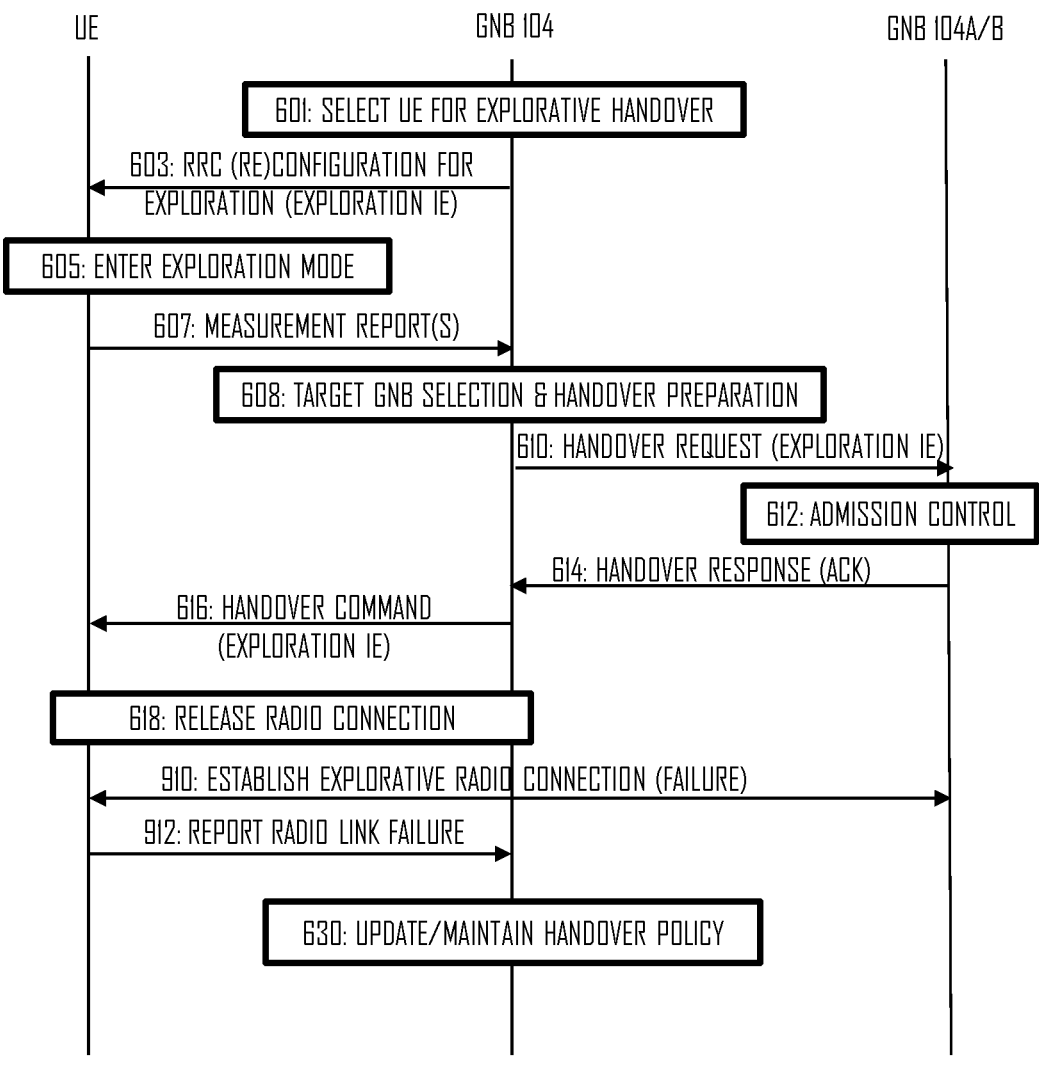

UE　　　　　　　　　GNB 104　　　　　　　GNB 104A/B

601: SELECT UE FOR EXPLORATIVE HANDOVER

603: RRC (RE)CONFIGURATION FOR
EXPLORATION (EXPLORATION IE)

605: ENTER EXPLORATION MODE

607: MEASUREMENT REPORT(S)

608: TARGET GNB SELECTION & HANDOVER PREPARATION

610: HANDOVER REQUEST (EXPLORATION IE)

612: ADMISSION CONTROL

614: HANDOVER RESPONSE (ACK)

616: HANDOVER COMMAND
(EXPLORATION IE)

618: RELEASE RADIO CONNECTION

910: ESTABLISH EXPLORATIVE RADIO CONNECTION (FAILURE)

912: REPORT RADIO LINK FAILURE

630: UPDATE/MAINTAIN HANDOVER POLICY

Fig 9B

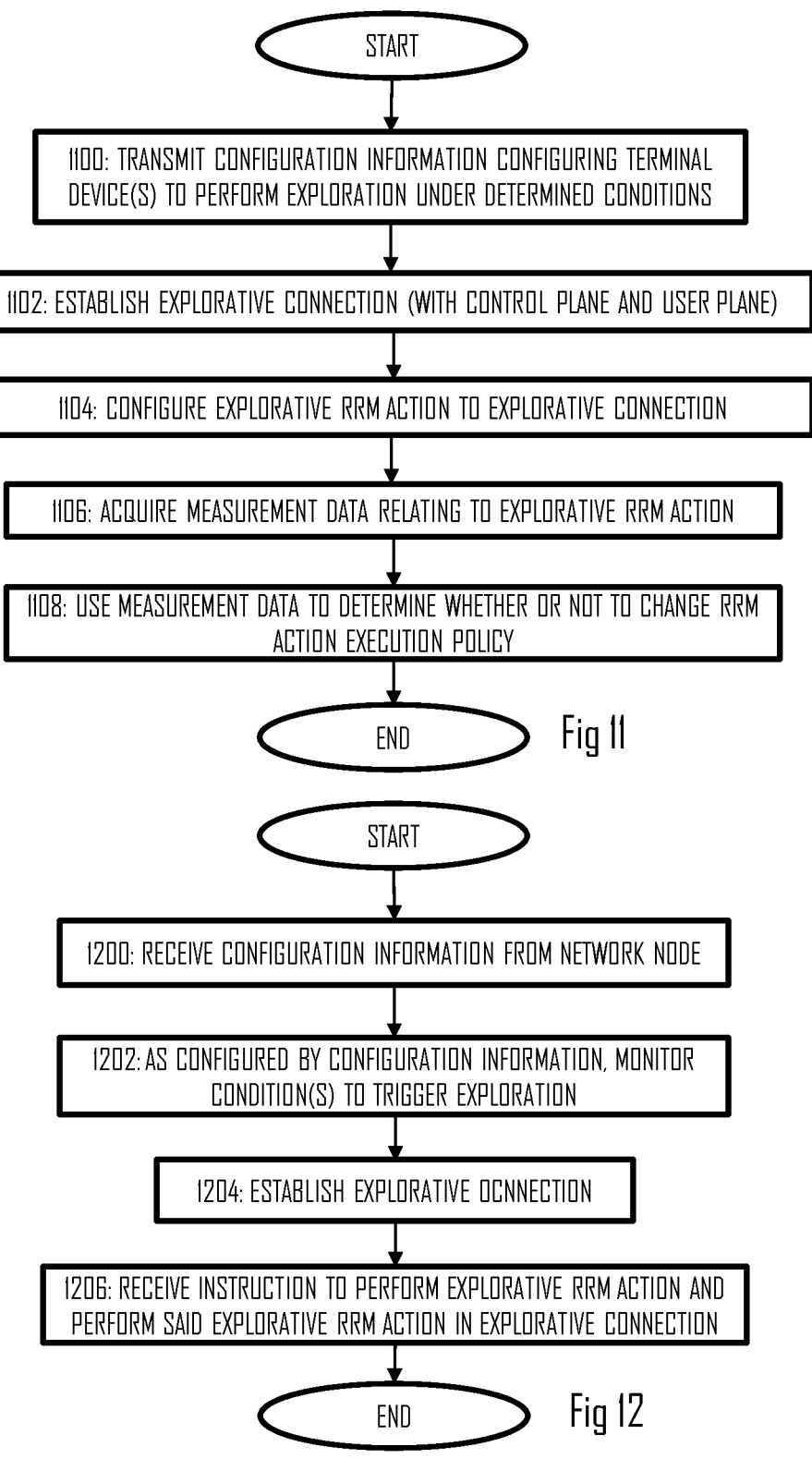

START

1100: TRANSMIT CONFIGURATION INFORMATION CONFIGURING TERMINAL DEVICE(S) TO PERFORM EXPLORATION UNDER DETERMINED CONDITIONS

1102: ESTABLISH EXPLORATIVE CONNECTION (WITH CONTROL PLANE AND USER PLANE)

1104: CONFIGURE EXPLORATIVE RRM ACTION TO EXPLORATIVE CONNECTION

1106: ACQUIRE MEASUREMENT DATA RELATING TO EXPLORATIVE RRM ACTION

1108: USE MEASUREMENT DATA TO DETERMINE WHETHER OR NOT TO CHANGE RRM ACTION EXECUTION POLICY

END     Fig 11

START

1200: RECEIVE CONFIGURATION INFORMATION FROM NETWORK NODE

1202: AS CONFIGURED BY CONFIGURATION INFORMATION, MONITOR CONDITION(S) TO TRIGGER EXPLORATION

1204: ESTABLISH EXPLORATIVE OCNNECTION

1206: RECEIVE INSTRUCTION TO PERFORM EXPLORATIVE RRM ACTION AND PERFORM SAID EXPLORATIVE RRM ACTION IN EXPLORATIVE CONNECTION

END     Fig 12

MACHINE LEARNING IN RADIO CONNECTION MANAGEMENT

CROSS REFERENCE TO RELATED APPLICATION

This patent application is a U.S. National Stage application of International Patent Application Number PCT/EP2020/075799 filed Sep. 16, 2020, which is hereby incorporated by reference in its entirety, and claims priority to PCT/EP2020/068752 filed Jul. 3, 2020, which is hereby incorporated by reference in its entirety.

FIELD

Various embodiments described herein relate to the field of wireless communications and, particularly, to using machine learning in managing a radio connection.

BACKGROUND

Machine learning is being brought into the wireless networks. For example, cellular communication systems are complex systems where a single action may cause various and sometimes unpredictable consequences. Therefore, use of machine learning principles may improve the performance of such systems.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a network node of a radio access network, comprising means for performing: causing transmission of configuration information from the network node, the configuration information configuring a terminal device to enter, in a state of not having a need to transfer data, an exploration mode where the terminal device has an explorative connection established with the network node, wherein a reduced set of radio connection functions enabled in the exploration mode compared with a default operating mode; configuring the terminal device to perform an explorative handover; determining a target network node for the explorative handover; transmitting to the target network node information indicating the explorative handover; after the explorative handover, receiving from the target network node measurement data associated with the explorative handover; and determining, on the basis of the received measurement data, whether or not to change a handover execution policy of the source network node.

In an embodiment, the configuration information defines at least one determined condition for the terminal device to enter the exploration mode.

In an embodiment, the at least one determined condition comprises a location of the terminal device.

In an embodiment, the at least one determined condition comprises the location of the terminal device at an edge of a cell managed by the network node.

In an embodiment, the means are configured to select the terminal device for the explorative handover on the basis of detecting that the terminal device has no need for data transfer.

In an embodiment, the means are configured to add the configuration information to a message transmitted by the network node during a connection release of the terminal device.

In an embodiment, the explorative connection comprises a control plane connection without a user plane connection during the explorative handover.

In an embodiment, the means are configured to: detect, while monitoring operation of radio connections of the network node, at least one problem in the handover execution policy; determining a context where the at least one problem occurs; and determining the configuration information on the basis of the context.

In an embodiment, the state of not having an active user plane connection is an idle state or an inactive state, and wherein the at least one condition is different for the idle state than for the inactive state.

In an embodiment, the means are configured to cancel the explorative handover upon detecting a paging message addressed to the terminal device.

In an embodiment, the information indicating the explorative handover to the target network node indicates to the target network node that a radio connection of the terminal device shall be released after the handover and that the target network node shall transmit the measurement data to the source network node in connection with the release.

In an embodiment, the means are configured to configure the terminal device to perform the explorative handover by performing at least the following: configuring a radio resource control connection as an explorative connection when the radio resource control connection is connected to the network node or upon establishing the radio resource control connection for the terminal device; and transmitting a handover command to the terminal device to trigger the explorative handover for the radio resource control connection.

In an embodiment, the means are configured to determine the target network node for the explorative handover based on receiving at least one measurement report from the terminal device.

In an embodiment, the means are configured to receive, from the terminal device if the explorative handover fails, a radio link failure report comprising an information element indicating that the radio link failure relates to the explorative handover.

According to an aspect, there is provided an apparatus for a terminal device, comprising means for performing: receiving configuration information from a network node of a radio access network; entering, in response to the configuration information and in a state of not having a need to transfer data, an exploration mode where a reduced set of radio connection functions are enabled compared with a default operating mode; triggering, in the exploration mode, an explorative handover from a source cell managed by the network node to a target cell; establishing a radio connection with a target network node as a result of the explorative handover to the target cell managed by the target network node; acquiring measurement data of the radio connection and transmitting the measurement data to the target network node.

In an embodiment, the means are configured to, in response to the configuration information, to monitor whether or not at least one determined condition is met and, in response to detecting that the at least one determined condition is met, enter the exploration mode and transmit a request for establishing an explorative connection to the network node.

In an embodiment, the means are configured to stop the monitoring or performing upon detecting a need to transfer data.

In an embodiment, the request comprises an information element indicating that the requested explorative connection is for exploring radio resource management actions.

In an embodiment, the at least one determined condition comprises at least one of the following: a determined location of the terminal device, a determined threshold or range for a parameter measured by the terminal device, and a determined time of day.

In an embodiment, the at least one determined condition comprises a parameter indicative of a received signal strength measured by the terminal device.

In an embodiment, the means are configured to enable control plane functions and disable user plane functions in the exploration mode.

In an embodiment, the means are configured to transmit, to the network node if the explorative handover fails, a radio link failure report comprising an information element indicating that the radio link failure relates to the explorative handover.

In an embodiment, the means are configured to release, in response to expiry of a timer counting duration of the radio connection, the radio connection with the target network node.

According to an aspect, there is provided an apparatus for a target network node of a radio access network, comprising means for performing: receiving, from a source network node, information indicating an explorative handover of a terminal device from a source cell managed by the source network node to a target cell managed by the target network node; establishing a radio connection with the terminal device as a result of the explorative handover; in response to the information indicating the explorative handover and establishing the radio connection with the terminal device, collecting measurement data associated with the explorative handover; and transmitting the measurement data to the source network node.

In an embodiment, the means are configured to establish the radio connection by establishing a control plane connection with the terminal device and skipping establishment of a user plane connection for the terminal device.

In an embodiment, the means are configured to start a timer in connection with establishing the radio connection, to release the radio connection upon expiry of the timer, and collect the measurement data while the timer is running.

In an embodiment, the means are configured to perform said collecting by recording, upon detection, at least one of a new handover decision for the radio connection and a radio link failure of the radio connection after the explorative handover.

In an embodiment, the means are configured to perform said collecting by at least receiving measurement data from the terminal device over the radio connection.

In an embodiment, the means are configured to, in response to the information indicating the explorative handover, disable radio resource allocation for the radio connection.

In an embodiment, the means comprise at least one processor and at least one memory including computer program code, the at least one memory and computer program code configured to, with the at least one processor, cause the performance of the apparatus.

program code configured to, with the at least one processor, cause the performance of the apparatus.

According to an aspect, there is provided a method for a network node of a radio access network, comprising: transmitting, by the network node, configuration information, the configuration information configuring a terminal device to enter, in a state of not having a need to transfer data, an exploration mode where the terminal device has an explorative connection established with the network node, wherein a reduced set of radio connection functions enabled in the exploration mode compared with a default operating mode; configuring, by the network node, the terminal device to perform an explorative handover; determining, by the network node, a target network node for the explorative handover; transmitting, by the network node, to the target network node information indicating the explorative handover; after the explorative handover, receiving from the target network node measurement data associated with the explorative handover; and determining, by the network node on the basis of the received measurement data, whether or not to change a handover 5 execution policy of the source network node.

In an embodiment, the configuration information defines at least one determined condition for the terminal device to enter the exploration mode.

In an embodiment, the at least one determined condition comprises a location of the terminal device.

In an embodiment, the at least one determined condition comprises the location of the terminal device at an edge of a cell managed by the network node.

In an embodiment, the network node selects the terminal device for the explorative handover on the basis of detecting that the terminal device has no need for data transfer.

In an embodiment, the network node adds the configuration information to a message transmitted by the network node during a connection release of the terminal device.

In an embodiment, the explorative connection comprises a control plane connection without a user plane connection during the explorative handover.

In an embodiment, the method further comprises: detecting, by the network node while monitoring operation of radio connections of the network node, at least one problem in the handover execution policy; determining, by the network node, a context where the at least one problem occurs; and determining, by the network node, the configuration information on the basis of the context.

In an embodiment, the state of not having an active user plane connection is an idle state or an inactive state, and wherein the at least one condition is different for the idle state than for the inactive state.

In an embodiment, the network node cancels the explorative handover upon detecting a paging message addressed to the terminal device.

In an embodiment, the information indicating the explorative handover to the target network node indicates to the target network node that a radio connection of the terminal device shall be released after the handover and that the target network node shall transmit the measurement data to the source network node in connection with the release.

In an embodiment, the network node configures the terminal device to perform the explorative handover by performing at least the following: configuring a radio resource control connection as an explorative connection when the radio resource control connection is connected to the network node or upon establishing the radio resource control connection for the terminal device; and transmitting a handover command to the terminal device to trigger the explorative handover for the radio resource control connection.

In an embodiment, the network node determines the target network node for the explorative handover based on receiving at least one measurement report from the terminal device.

In an embodiment, the network node receives, from the terminal device if the explorative handover fails, a radio link failure report comprising an information element indicating that the radio link failure relates to the explorative handover.

According to an aspect, there is provided a method for a terminal device, comprising: receiving, by the terminal device, configuration information from a network node of a radio access network; entering, by the terminal device in response to the configuration information and in a state of not having a need to transfer data, an exploration mode where a reduced set of radio connection functions are enabled compared with a default operating mode; triggering, by the terminal device in the exploration mode, an explorative handover from a source cell managed by the network node to a target cell; establishing, by the terminal device, a radio connection with a target network node as a result of the explorative handover to the target cell managed by the target network node; acquiring, by the terminal device, measurement data of the radio connection and transmitting the measurement data to the target network node.

In an embodiment, the terminal device monitors, in response to the configuration information, whether or not at least one determined condition is met and, in response to detecting that the at least one determined condition is met, enters the exploration mode and transmits a request for establishing an explorative connection to the network node.

In an embodiment, the terminal device stops the monitoring or performing upon detecting a need to transfer data.

In an embodiment, the request comprises an information element indicating that the requested explorative connection is for exploring radio resource management actions.

In an embodiment, the at least one determined condition comprises at least one of the following: a determined location of the terminal device, a determined threshold or range for a parameter measured by the terminal device, and a determined time of day.

In an embodiment, the at least one determined condition comprises a parameter indicative of a received signal strength measured by the terminal device.

In an embodiment, the terminal device enables control plane functions and disables user plane functions in the exploration mode.

In an embodiment, the terminal device transmits, to the network node if the explorative handover fails, a radio link failure report comprising an information element indicating that the radio link failure relates to the explorative handover.

In an embodiment, the terminal device releases, in response to expiry of a timer counting duration of the radio connection, the radio connection with the target network node.

According to an aspect, there is provided a method for a target network node of a radio access network, comprising means for performing: receiving, by the target network node from a source network node, information indicating an explorative handover of a terminal device from a source cell managed by the source network node to a target cell managed by the target network node; establishing, by the target network node, a radio connection with the terminal device as a result of the explorative handover; in response to the information indicating the explorative handover and establishing the radio connection with the terminal device, collecting by the target network node measurement data associated with the explorative handover; and transmitting, by the target network node, the measurement data to the source network node.

In an embodiment, the target network node establishes the radio connection by establishing a control plane connection with the terminal device and skipping establishment of a user plane connection for the terminal device.

In an embodiment, the target network node starts a timer in connection with establishing the radio connection, releases the radio connection upon expiry of the timer, and collects the measurement data while the timer is running.

In an embodiment, the target network node performs said collecting by recording, upon detection, at least one of a new handover decision for the radio connection and a radio link failure of the radio connection after the explorative handover.

In an embodiment, the target network node performs said collecting by at least receiving measurement data from the terminal device over the radio connection.

In an embodiment, the target network node disables, in response to the information indicating the explorative handover, radio resource allocation for the radio connection.

According to an aspect, there is provided a computer program product embodied on a computer-readable medium and comprising a computer program code readable by a computer, wherein the computer program code configures the computer to carry out a computer process in a network node of a radio access network, the computer process comprising: causing transmission of configuration information from the network node, the configuration information configuring a terminal device to enter, in a state of not having a need to transfer data, an exploration mode where the terminal device has an explorative connection established with the network node, wherein a reduced set of radio connection functions enabled in the exploration mode compared with a default operating mode; configuring the terminal device to perform an explorative handover; determining a target network node for the explorative handover; transmitting to the target network node information indicating the explorative handover; after the explorative handover, receiving from the target network node measurement data associated with the explorative handover; and determining, on the basis of the received measurement data, whether or not to change a handover execution policy of the source network node.

According to an aspect, there is provided a computer program product embodied on a computer-readable medium and comprising a computer program code readable by a computer, wherein the computer program code configures the computer to carry out a computer process in a terminal device, the computer process comprising: receiving configuration information from a network node of a radio access network; entering, in response to the configuration information and in a state of not having a need to transfer data, an exploration mode where a reduced set of radio connection functions are enabled compared with a default operating mode; triggering, in the exploration mode, an explorative handover from a source cell managed by the network node to a target cell; establishing a radio connection with a target network node as a result of the explorative handover to the target cell managed by the target network node; acquiring measurement data of the radio connection and transmitting the measurement data to the target network node.

According to an aspect, there is provided a computer program product embodied on a computer-readable medium and comprising a computer program code readable by a computer, wherein the computer program code configures the computer to carry out a computer process in a target network node of a radio access network, the computer process comprising: receiving, from a source network node, information indicating an explorative handover of a terminal device from a source cell managed by the source network node to a target cell managed by the target network node; establishing a radio connection with the terminal device as a result of the explorative handover; in response to the information indicating the explorative handover and establishing the radio connection with the terminal device, collecting measurement data associated with the explorative handover; and transmitting the measurement data to the source network node.

LIST OF DRAWINGS

Embodiments are described below, by way of example only, with reference to the accompanying drawings, in which FIGS. 1 and 2 illustrate a wireless communication scenario to which some embodiments of the invention may be applied;

FIGS. 3A and 4A illustrate some embodiments for performing an explorative radio resource management action in a radio access network;

FIGS. 3B, 3C, and 4B illustrate some embodiments for performing an explorative handover in a radio access network;

FIG. 5 illustrates a procedure for monitoring a location of a terminal device as a condition for triggering exploration according to an embodiment;

FIG. 9B illustrates a procedure for operation in case of a radio link failure in connection with an explorative handover according to an embodiment;

FIGS. 11 and 12 illustrate embodiments for configuring and performing exploration of a radio resource management action;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
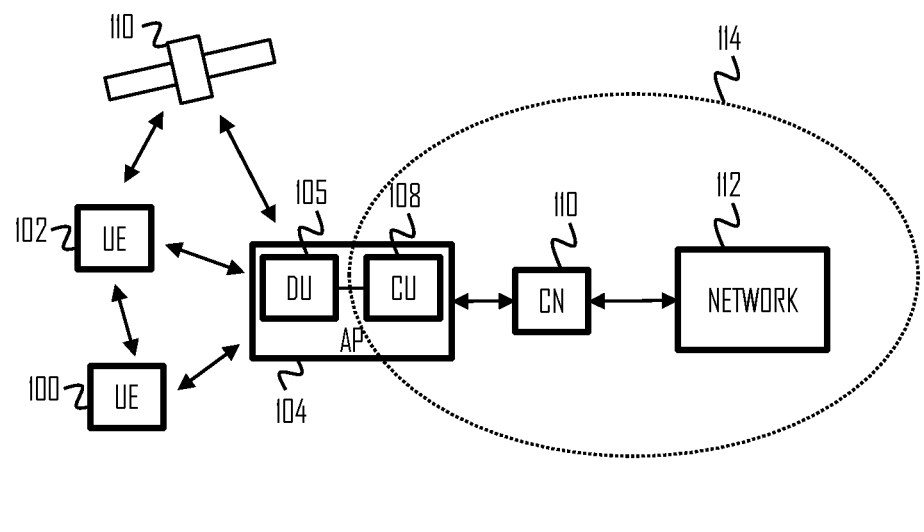

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (c/g) NodeBs may also be configured to communicate with one another over links, wired or wireless, designed for the purpose. These links may be used not only for signalling purposes but also for routing data from one (c/g) NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communinications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular megaconstellations (systems in which hundreds of (nano) satellites are deployed). Each satellite 110 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home(e/g)NodeBs (H (e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
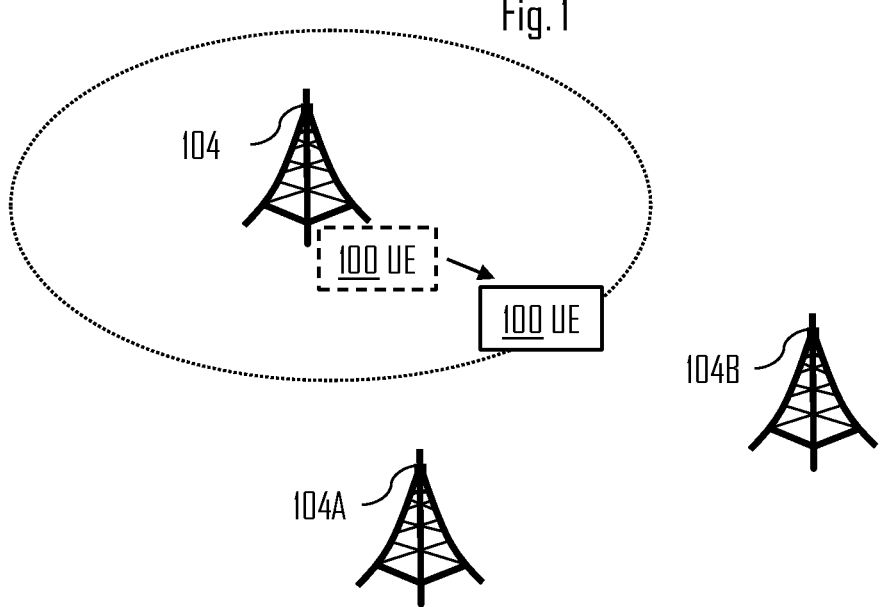

In general, a machine learning agent functions and learns based on given data available to the agent. Reinforcement learning is an area of machine learning where the data is collected by interacting with the environment via actions. At first, the agent may not have any prior data or knowledge of the environment, and it learns to solve the given task via trial and error, by performing explorative actions based on the current knowledge/data. The explorative action may cause unpredictable consequences to the involved parties or connections and, therefore, it would be advantageous to limit adverse effects of the exploration. On the other hand, radio network optimization is a complex task which has been conventionally tackled by using various heuristic algorithms and optimization of the algorithm parameters. Radio environment characteristics vary in frequency, time, and space. Such variation may be further emphasized by dynamic nature of radio resource management (RRM) functions performed by network nodes in proximity to one another. FIG. 2 illustrates such a scenario where a terminal device is in proximity of multiple access nodes 104, 104A, 104B. Let us consider that the access node 104 currently serves the terminal device with a radio resource control (RRC) connection. The serving access node may provide the terminal device with access to the cellular network and to other networks via the RRC connection. As the terminal device 100 moves, the other access nodes are potential candidates for a handover. As known in the art, the RRC connection is logically handed over from a source cell managed by a source access node to a target cell managed by a target access node. The access nodes may communicate with one another via a backhaul interface such as an Xn interface specified in specifications of a $3^{rd}$ Generation Partnership Project (3GPP) for 5G. The backhaul interface may be used to negotiate the handover and transfer contextual parameters of the terminal device and the RRC connection, for example.

Characteristics of the handover may affect the performance of the RRC connection. For example, if the handover is carried out too early or too late, the terminal device may experience a radio link failure because of a deteriorating connection quality, for example. If the handover is performed to a wrong cell, the terminal device may need a new handover shortly, thus increasing signalling overhead. The handovers under various conditions may be tested through the exploration where an exploring network node may specify one or more conditions where the exploration of the handovers is performed, e.g. under conditions where problems with handovers have been detected. In order to reduce the above-mentioned adverse effects of exploring the handovers, e.g. degraded quality of service (QoS), it might be advantageous to limit the exploration to terminal devices that have no active data connection, e.g. that are in an RRC idle state, RRC inactive state, or in a corresponding inactive state with no need to transfer data. Further, it may be advantageous to perform the exploration under certain conditions, e.g. when a terminal device is at a cell edge or otherwise under conditions where the exploration is deemed to be performed.

FIGS. 3A and 4A illustrate some embodiments for testing explorative handovers in a radio access network of a cellular communication system. The purpose of the testing may be to determine or measure effects of the handover, performed through exploration, on performance of the RRC connection subjected to the explorative handover and/or to other RRC connections or the system in general. FIG. 3A illustrates a process for a network node (of a radio access network) that manages a cell where a terminal device is camping, e.g. the access node 104 or another network node performing functions of the access node 104 or controlling the access node 104. The network node may manage RRC connections of terminal devices.

Referring to FIG. 3A, the process comprises as performed by the network node: causing transmission (block 300) of configuration information from the network node, the configuration information configuring a terminal device to enter, in a state of not having a need to transfer data, an exploration mode where the terminal device has an explorative connection established with the network node, wherein a reduced set of radio connection functions enabled in the exploration mode compared with a default operating mode; configuring (block 302) the terminal device to perform an explorative handover; determining (block 302) a target network node for the explorative handover; transmitting (block 304) to the target network node information indicating the explorative handover; after the explorative handover, receiving (block 306) from the target network node measurement data associated with the explorative handover; and determining (block 308), on the basis of the received measurement data, whether or not to change a handover execution policy of the source network node.

FIG. 4A illustrates a corresponding process for the terminal device. Referring to FIG. 4A, the process comprises as performed by the terminal device: receiving (block 400) configuration information from a network node of a radio access network; entering (block 402), in response to the configuration information and in a state of not having a need to transfer data, an exploration mode where a reduced set of radio connection functions are enabled compared with a default operating mode; triggering (block 404), in the exploration mode, an explorative handover from a source cell managed by the network node to a target cell; establishing (block 404) a radio connection with a target network node as a result of the explorative handover to the target cell managed by the target network node;

acquiring (block 406) measurement data of the radio connection and transmitting the measurement data to the target network node.

In an embodiment, the explorative radio connection comprises a RRC connection. The explorative RRC connection may be established with or without a non-access stratum (NAS) connection.

FIGS. 3B, 3C, and 4B illustrate some embodiments for testing explorative handovers in a radio access network of a cellular communication system. The purpose of the testing may be to determine or measure effects of a handover, performed through exploration, on performance of the RRC connection subjected to the explorative handover. FIG. 3B illustrates a process for a network node that manages a source cell of the handover, e.g. an access node or another network node performing functions of the access node or controlling the access node. Referring to FIG. 1, the network node may be the access node 104 or another network node in the in the radio access network. The network node may manage RRC connections of terminal devices.

Referring to FIG. 3B, the process comprises as performed by the source network node: selecting (block 310) a terminal device for an explorative handover, wherein the terminal device is selected on the basis of detecting that the terminal device has no need for data transfer; configuring (block 312) the terminal device to perform the explorative handover; determining a target network node for the explorative handover and transmitting (block 314) to the target network node information indicating the explorative handover of the radio connection; after the explorative handover, receiving (block 316) from the target network node measurement data associated with the explorative handover; and determining (block 318), on the basis of the received measurement data, whether or not to change a handover execution policy of the source network node.

FIG. 3C illustrates a corresponding process for the target network node that manages the target cell of the explorative handover. The target network node may be an access node 104A or 104B or another network node in the radio access network. Referring to FIG. 3C, the process comprises as performed by the target network node: receiving (block 320), from a source network node information indicating an explorative handover of a terminal device from a source cell managed by the source network node to a target cell managed by the target network node; establishing (block 322) a radio connection with the terminal device as a result of the explorative handover; in response to the information indicating the explorative handover and establishing the radio connection with the terminal device, collecting (block 324) measurement data associated with the explorative handover; and transmitting (block 326) the measurement data to the source network node.

FIG. 4B illustrates a corresponding process for the terminal device. Referring to FIG. 4B, the process comprises as performed by the terminal device: receiving (block 410), from a source network node information indicating an explorative handover of the terminal device; in response to the received information indicating the explorative handover, entering (block 412) an exploration mode where a reduced set of radio connection functions are enabled compared with a default operating mode; determining a target cell for the explorative handover and establishing (block 414), in the exploration mode, a radio connection with a target network node as a result of the explorative handover to the determined target cell managed by the target network node; acquiring measurement data of the radio connection and transmitting (block 416) the measurement data to the target network node.

The embodiments described above provide several advantages. For example, selecting a terminal device with no need for data transfer for the exploration prevents or at least reduces degradation of quality-of-service or quality-of-experience. Because there is no payload data to transfer, there are no degradation of data throughput or latency, for example. The explorative handover in general provides the possibility of safely testing various conditions for triggering or performing the handover. It enables the network node to experiment, through said exploration, the handover under conditions where it might not normally trigger the handover. Accordingly, the network node may determine to change the handover execution policy for detecting beneficial new conditions for triggering the handover, thus improving the system performance. The experimental handovers may be carried out on top of conventional (corresponding) handovers of connected terminal devices. As a consequence, the experimental handovers increase the statistics available to a machine learning algorithm managing the execution policy and making decisions of the handovers.

It should be appreciated that while the Figures illustrate the steps in a particular order, the steps are performed in an alternative order in other embodiments. For example, the source network node may select the terminal device and determine the target network node in step 310 before step 312. Similarly, block 314 may precede block 312.

In an embodiment, the state of not having a need for data transfer comprises an idle state or inactive state of the terminal device, e.g. RRC Idle or RRC Inactive specified in the 3GPP specifications.

When establishing the explorative (radio) connection, the terminal device may enter the explorative mode. The explorative mode in the terminal device may enable execution of the explorative handovers with a reduced set of functions enabled. In an embodiment, a radio connection subjected to the explorative handover comprises a control plane connection without a user plane connection. For example, when explorative the radio connection is established for the purpose of the explorative handover, the establishment of the user plane connection may be skipped and only the control plane connection is established. Depending on the embodiment, the radio connection may be established between the source network node and the terminal device, wherein the radio connection comprises both the control plane connection and the user plane connection. Upon triggering the explorative handover, the control plane connection may be handed over to the target network node in the explorative handover while the data plane connection may be maintained at the source network node.

For the sake of definition, the user plane relates to transfer of application data to/from the terminal device. An application layer application executed in the terminal device may create data packets that are processed by protocols such as transport control protocol (TCP) and internet protocol (IP) and then transmitted to a user plane of a connection between the terminal device and the cellular communication system. The user plane connection may comprise one or more data bearers transferring the application data, wherein the data bearers may comprise one or more data radio bearers. In the control plane, signalling messages are exchanged for the purpose of controlling the radio connection and the core network connection of the terminal device. The terminal device establishes the control plane connection typically with the serving access node and a serving mobility management agent such as a mobility management entity (MME) in the LTE or Access and Mobility Management Function (AMF) in the 5G system. The control plane connection may comprise one or more signaling bearers that may comprise one or more signaling radio bearers. The user plane connection (or a protocol data unit (PDU) session) may be established between the terminal device and a user plane function (UPF) under the influence of the AMF, for example.

With respect to determining the target cell for the explorative handover, the entity selecting the target cell may be either the source network node or the terminal device. Upon configuring the terminal device for the explorative handover, or before that, the terminal device may transmit one or more measurement reports to the source network node. The measurement reports may comprise a received signal strength indicator indicating a strength of a signal received by the terminal device from one or more cells that are candidates for the explorative handover. The source network node may then select the target cell (in block 310 or 314), transmit the indication (block 314) to the selected target cell and a handover command to the terminal device. The handover command may indicate the selected target cell to the terminal device, and the terminal device may then start block 414 towards the selected target cell. In the embodiment where the terminal device selects the target cell, the source network node may transmit the indication (block 314) to a plurality of other network nodes that are determined to be candidates for the explorative handover. Accordingly, multiple network nodes may be prepared for the exploration. The terminal device may select the target cell on the basis of the signal strength measurements and start block 414 towards the selected target cell. The target cell will then become the target cell for the explorative handover and will carry out the process of FIG. 3C. The other candidate target network nodes that are not selected may cancel the preparations.

In an embodiment, the configuration information transmitted in block 300 and received in block 400 defines at least one determined condition for the terminal device to enter the exploration mode. The terminal device may be configured to, in response to the received configuration information, to monitor whether or not the at least one determined condition is met and, in response to detecting that the at least one determined condition is met, enter the exploration mode and transmit a request for establishing an explorative connection to the network node.

In an embodiment, the network node carrying out the procedure of FIG. 3A adds the configuration information to a message transmitted by the network node to the terminal device during a connection release of the terminal device. In other words, when sending the terminal device to the inactive or idle state, the terminal device is provided with the configuration information that triggers the terminal device to monitor the conditions for entering the connected state for the exploration. This enables allowing the terminal device to switch to a state with lower power consumption until the condition(s) is/are met.

In another embodiment, the network node carrying out the procedure of FIG. 3A adds the configuration information to a message broadcasted by the network node in one or more cells managed by the network node. In this embodiment, the configuration information is added to system information broadcasted by the network node, and the configuration information may be read by any terminal device in the cell(s).

In an embodiment, the configuration information comprises or triggers the at least one determined condition for the terminal device to enter the exploration mode. The at least one condition may comprise a location of the terminal device. The location may be at an edge of a cell managed by the network node, wherein the explorative radio resource management function is an explorative handover from the cell to a target cell. According to this embodiment, the terminal device may monitor the conditions until it detects its presence at the edge of the cell and, in response to the detection, block 404 is executed and the terminal device requests for the explorative connection. FIG. 5 illustrates this embodiment. Referring to FIG. 5, the terminal device measures in block 500 one or more parameters that describe the location of the terminal device in the cell. In an embodiment, the measured parameter(s) comprises a location of the terminal device in coordinates of a global navigation satellite system (GNSS) such as a Global Positioning System or Galileo. The configuration information may specify a location of the network node and the distance from the location of the network node that sets the condition and triggers the exploration. Upon measuring its own location, the terminal device may compute the distance and compare the distance with a threshold defining the condition for triggering the exploration. In another embodiment, the measured parameter(s) comprises a measured reception signal strength indication (RSSI) measured from a signal received by the terminal device from the network node in the cell. In this embodiment, the threshold for triggering the exploration may also be specified in the configuration information. Comparison between the threshold or thresholds and the measured parameter describing the location of the terminal device may be carried out in block 502. If the comparison indicates the location in the centre of the cell or elsewhere than on the edge of the cell, the procedure may return to block 500 for another measurement. If the comparison indicates that the terminal device is located at the cell edge, the process may proceed to block 404.

As a further embodiment indicating the location, the configuration information may specify a condition where the terminal proceeds to block 404 upon detecting a specified neighbouring cell. Yet further indication of an appropriate location of the terminal device for the exploration may be detection of a specified radio beam transmitted by the network node. The network node may transmit spatially distinct (narrow) radio beams. The radio beams may be discriminated laterally and/or by elevation of the beam from an antenna site of the network node. The configuration information may specify an identifier of one or more radio beams where the exploration shall be performed. Upon detecting one of the radio beams, the terminal device may execute block 404. Any other radio 'fingerprinting' method for specifying the desired location of the terminal device for the exploration may be defined in the configuration information.

The location may be specified in a broader sense than within a cell. For example, the location may be defined as an area such as a specific cell or multiple cells, e.g. a tracking area formed by multiple cells. In other words, upon detecting its presence within the area, e.g. in the specified cell or tracking area as specified in the configuration information, the terminal device may trigger block 404.

There are also other factors causing the handover, e.g. poor coverage at the centre of the cell, high traffic in the cell, etc. Therefore, the condition for triggering the exploration for exploring the handover may differ from the actual location of the terminal device, and the condition may be specified in the configuration information. For example, the configuration information may specify a condition where the terminal device triggers block 404 upon detecting poor coverage, and the measure of the poor coverage may be the RSSI, for example.

In general, the at least one determined condition may comprise a determined range for a parameter measured by the terminal device. The parameter may be the location, the signal strength, a determined time of day, another parameter, or any combination of these parameters. For example, the at least one determined condition may be the location of the terminal device at the cell edge between 7 am to 9 am.

In an embodiment, the at least one condition is different for the idle state than for the inactive state.

The terminal device may also have a condition for ending the monitoring in block 402 of 500. This may be indicated in the configuration information. For example, when the terminal device exits the coverage area of the network node, the tracking area, or another area where the monitoring shall be performed, it may end the monitoring. Another condition may be the time, e.g. the configuration information may specify a time span for the exploration. If the time span ends during the monitoring, the terminal device may end the monitoring. The same applies to the exploration while the explorative connection is operational. If the time span ends, the terminal device may initiate release of the explorative connection. The ending may be determined and performed by the terminal device autonomously or without any interaction with the network node or, when the ending involves the release of the explorative connection, the ending may include release signalling with the network node.

Figure 6:
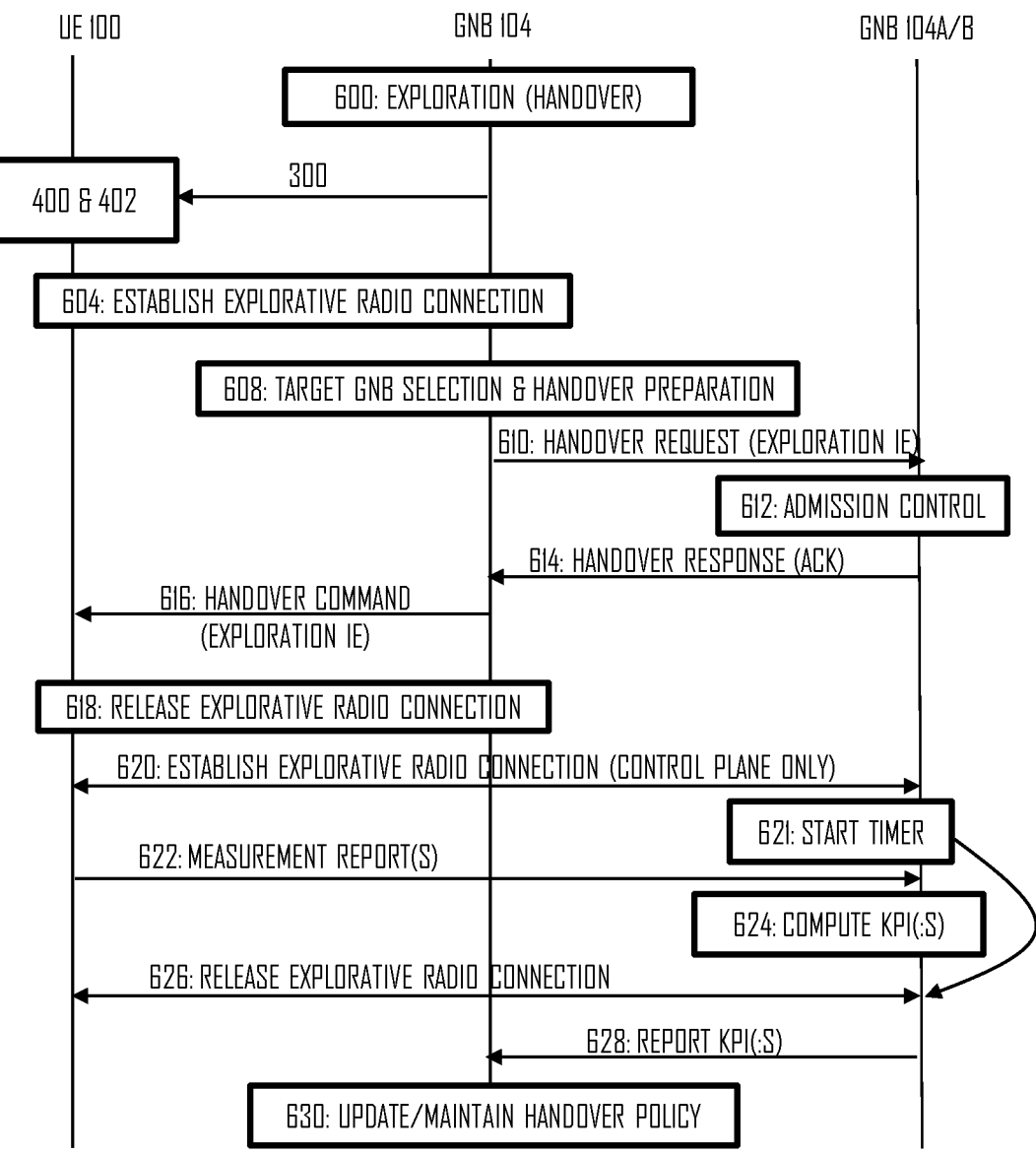
FIG. 6 illustrates a signalling diagram combining the procedures of FIGS. 3A and 4A and illustrating further embodiments.

FIG. 6 illustrates a signalling diagram of an embodiment combining the processes of FIGS. 3A and 4A and illustrating further embodiments. In the embodiment of FIG. 6, the access node (gNB) 104 operates as the network node while the access node 104A or 104B is also involved in the exploration. In this embodiment, the explorative handover is from the access node 104 (source access node) to the access node 104 A/B (target access node). In other situations where the access node 104A or 104B chooses to perform the exploration and selects the gNB 104 as the target network node, the roles may be switched.

Referring to FIG. 6, the gNB 104 determines to perform exploration on handover(s) in block 600. Block 600 may be based on detecting problems in handovers at a certain area in a cell managed by the gNB, detecting outage in the cell, or arbitrary decision to explore the handovers for improving a handover decision policy. Block 600 may also comprise determining the configuration information for the exploration, e.g. the at least one condition for triggering the exploration by one or more terminal devices in the cell.

In an embodiment, the gNB 104 further selects a terminal device for the explorative handover in block 600. The terminal device 100 may be selected on the basis of the criterion that the terminal device 100 has no data to transfer. The terminal device may be in a connected state, an inactive state, or in an idle state with respect to the gNB 104. In another embodiment, the terminal device is selected on the basis of detecting a part of the radio access network where training data is needed for the machine learning model training e.g. a problematic cell edge that is experiencing radio link failures. Upon detecting a terminal device in such an area and suitable for the exploration, the terminal device may be selected in block 600. In yet another embodiment, the terminal device is selected randomly to meet a certain target amount of exploration that enables the network node to follow potential changes in the radio access network. In yet another embodiment, the gNB 104 selects no specific terminal device but broadcasts the conditions defining one or more triggers for a terminal device to enter the exploration mode for the handover.

In step 300, the gNB transmits the configuration information to the terminal device 100. In an embodiment where the terminal device is in the RRC connected state and has established a radio connection with the gNB 104, the gNB 104 may transmit the configuration information in a RRC connection release message. In an embodiment where the terminal device is in the RRC idle mode or has no radio connection with the gNB 104, the gNB may broadcast the configuration information, or transmit a paging message to page the terminal device and, upon receiving a RRC connection request from the terminal device, transmit the configuration information to the terminal device. In either embodiment, the (re)configuration performed in step 300 may include transmission of at least one message from the gNB 104 to the terminal device that includes at least one information element triggering the terminal device to enter an exploration mode where the terminal device is configured to perform the exploration. In embodiments where the at least one information elements specifies the at least one condition for entering the exploration mode, the terminal device may start monitoring when the at least one condition is met and, as a consequence, enter the exploration mode. The monitoring may be performed in the idle/inactive state.

Upon receiving the configuration information indicating that the terminal device has been selected for the exploration, the terminal device may determine whether or not to accept the exploration. For example, if the terminal device has low battery or has another condition that justifies rejection of the exploration request, the terminal device may transmit, as a response to the message carrying the configuration information, a message rejecting the exploration. Thereafter, the procedure may end for the terminal device and the gNB 104 may return to block 600 to select another terminal device. However, let us assume that the terminal device accepts the exploration and proceeds to the exploration mode, either directly or upon detecting that the at least one condition is met.

When the radio connection has been configured to monitor for triggering the exploration, the terminal device may perform the above-described measurements for the purpose of determining whether or not the at least one condition for triggering the exploration has been met. As described above, the measurements may include measuring the location of the terminal device, measuring a signal received by the terminal device, or measuring a time of day. When the terminal device detects that the at least one condition is met, the terminal device may initiate establishment of the explorative connection with the gNB (block 604) by transmitting a request for establishing the explorative connection to the gNB 104. In an embodiment, the request for establishing the explorative connection comprises an information element indicating that the requested explorative connection is for exploration, thus enabling the gNB to distinguish the request from a conventional connection request. Accordingly, the gNB may trigger a different connection establishment procedure, e.g. one without the user plane connection or with a reduced set of functions with respect to the convention connection.

In an embodiment where the terminal device is in the idle state, the request for establishing the explorative connection is RRCSetupRequest specified in the 3GPP specifications. In an embodiment where the terminal device is in the inactive state, request for establishing the explorative connection is RRCResumeRequest also specified in the 3GPP specifications, indicating 'exploration' as ResumeCause.

When the explorative connection has been established, the terminal device may perform conventional measurements related to the operation of the connection, e.g. neighbor cell measurements, acquire measurement data and transmit measurement reports comprising the measurement data to the gNB 104. The measurement reports may comprise a received signal strength indicator indicating a strength of a signal received by the terminal device from the gNB 104A and/or 104B. The received signal strength indicator may be a reference signal reception power (RSRP) defined in the 3GPP specifications, for example. The received signal strength indicator may be reported for multiple neighboring cells in the measurement report(s). On the basis of the measurement report(s), the gNB serving the terminal device may select a target cell for the explorative handover (block 608). In order for the handover decision to be explorative, the gNB 104 may perform the handover decision such that it deviates from the current handover execution policy. For example, the gNB 104 may select, as a target cell of the handover, a cell associated with a lower received signal strength indicator than a lowest limit in the current handover execution policy. Accordingly, the handover may be triggered to a cell indicating a lower connection quality than allowed in the current handover execution policy. From another perspective, if the current handover decision policy defines a selection logic that would result in selecting a certain target cell for the handover, the selection in block 608 may result in selecting a different target cell for the handover. For example, the handover decision policy may specify one or more allowed frequency bands for the target cell, and the handover may be triggered to a target cell operating on another frequency band than allowed by the handover decision policy. In another example, the handover decision policy may specify a maximum delay for executing the handover to a target cell, and the handover may be triggered after expiry of the maximum delay.

In yet another embodiment, the exploration is performed by adding 'noise' to one or more parameters used as threshold(s) or conditions in the handover decision policy. The noise may be understood as a random offset to the parameter(s), thus changing the handover decision policy temporarily for the exploration. A further example of the randomization exploration is to add noise to a selection logic employed in the handover decision policy. For example, if the handover decision policy comprises use of a neural network. noise may be added to neural network weights, resulting in slightly different handover decision policy for the exploration. In yet another embodiment, the selection of the target cell may be randomized such that the target cell becomes selected amongst a set of candidate target cells determined based on measurement reports, for example.

Upon selecting the target cell, the gNB 104 may determine the target network node that manages the target cell and start handover preparations for handing the radio connection over to the target network node. Upon performing the preparations in block 608, the gNB 104 may transmit a handover request to the target network node, (gNB 104A or 104B). The handover request may comprise the information indicating that the requested handover is the explorative handover. Additionally, the handover request may indicate the terminal device 100 and/or the connection that is subjected to the explorative handover. The information may be provided as an information element in the handover request, e.g. as an exploration flag. A similar exploration flag may be in the request for establishing the explorative connection transmitted by the terminal device.

The exploration flag may be an indicator to the target network node that there is no need to allocate any radio resources to the terminal device of the explorative radio connection. As a consequence, the target network node may disable the radio resource allocation for the explorative radio connection.

The exploration flag may also serve as information indicating to the target network node that the radio connection shall be released after the handover and that the target network node shall transmit measurement data measured in connection with the explorative handover to the source network node in connection with the release.

In an embodiment, the handover request additionally comprises one or more information elements configuring measurement data collection and/or reporting to the target network node. The information element(s) may configure, for example, what KPI(s) or parameters the target network node shall measure and report to the gNB 104. Upon receiving the handover request with the exploration flag, the target network node may determine, on the basis of the exploration flag, that the handover is explorative and, as a consequence, the target network node may enable a reduced set of handover functions compared with the conventional handover. In block 612, the target network node may perform admission control for the explorative handover to determine whether or not to accept the explorative handover. For example, if the target network node considers itself to be congested, it may reject the handover request. However, let us assume that the target network node accepts the explorative handover and transmits a handover response message to the gNB 104 in step 614 to acknowledge the handover. The handover response message may include one or more handover parameters.

In step 616, the gNB 104 transmits a handover command to the UE. The handover command is an embodiment of configuring the terminal device to perform the handover (block 302). The handover command may comprise an explorative handover configuration as a part of the RRC-reconfiguration to execute the explorative handover. The handover command may, for example, identify the target network node to the terminal device so that the terminal device is able to establish an explorative radio connection with the target network node in the target cell. This configuration may include minimum information to access the target cell, without reading system information, and to establish the explorative radio connection. The minimum information may include L1/L2 parameters, a random access channel (RACH) configuration, a dedicated RACH pre-amble and cellular radio network temporary identifier (C-RNTI) for the terminal device. However, a data radio bearer configuration may be omitted because no user plane connection needs to be established for the explorative radio connection.

Upon receiving the handover command, the terminal device and the gNB 104 may release the (explorative) radio connection between them (block 618), and the terminal device may access the target network node in the target cell to establish an explorative radio connection in the target cell (step 620). As a result, the explorative radio connection is effectively handed over from the gNB 104 to the target network node with the release and establishment. From another perspective, the RRC connection of the terminal device is handed over with the release and establishment of the explorative radio connection. In step 620, only the control plane connection may be established between the target network node and the terminal device. In connection with the establishment of the explorative radio connection in the target cell, the target network node may start a timer counting duration of the explorative radio connection (block 621). Upon expiry of the time, the explorative radio con-nection may be released (Step 626). The release may be triggered by the target network node monitoring the expiry of the timer. In another embodiment, the terminal device starts the timer (block 621) and, upon expiry of the timer, initiates the release of the explorative radio connection (step 626).

In an embodiment, the duration counted by the timer is multiple seconds, e.g. five seconds. In another embodiment, the duration counted by the timer is less than a second. The duration of the timer may be set sufficiently high to detect possible events that may occur after the handover, e.g. ping-pong handover back to the source network node or a radio link failure.

While the timer is running and while the explorative radio connection between the terminal device and the target net-work node is operational, measurements may be made and corresponding measurement data may be collected (step 622). The measurements may comprise measuring, by the terminal device, one or more received signal strength indi-cators and transmitting one or more measurement reports to the target network node (step 622), each measurement report comprising at least one received signal strength indicator (e.g. the RSRP) as the measurement data. Upon receiving the measurement report(s) in step 622, the target network node may store the measurement data. In an embodiment, the target network node computes (block 624) one or more key performance indicators (KPI) from the received mea-surement data. Examples of the KPIs include a number of radio link failures of the radio connection, a handover success count, etc. The target network node may then report the measurement data and/or the computed KPI(s) to the source network node (step 628). The reporting may be made in connection with the release of the explorative radio connection (step 626). In some embodiments where multiple reports are transmitted, some of the reports may be trans-mitted before the release while one or more other reports are transmitted upon the release.

In an embodiment, collecting the measurement data (e.g. block 624) comprises recording, upon detection, at least one of a new handover decision for the explorative radio con-nection and a radio link failure of the explorative radio connection after the explorative handover.

Upon receiving the measurement data and/or the KPI(s), the source network node may input the measurement data, the received KPI(s) or further KPI(s) computed from the measurement data and/or from the received KPI(s) as train-ing input to a machine learning algorithm. The machine learning algorithm may use the training input to determine whether or not to modify the current handover decision policy (block 630). Some embodiments of block 630 are described below.

In an embodiment, the network node may determine in block 600 the duration of the exploration, e.g. in terms of absolute time or in terms of a number of explorative han-dovers. When the duration is reached in the exploration, the network node and/or the terminal device may end the exploration and release the explorative connection.

In some of the above-described embodiments, the explor-ative connection comprises the control plane connection without the user plane connection. If the explorative han-dover requires transfer of data, also the user plane connec-tion may be established. The data transferred may be arti-ficial 'dummy' exploration data so that no real payload data needs to be involved, thus avoiding potential adverse effects of the exploration on connection quality.

Figure 7:
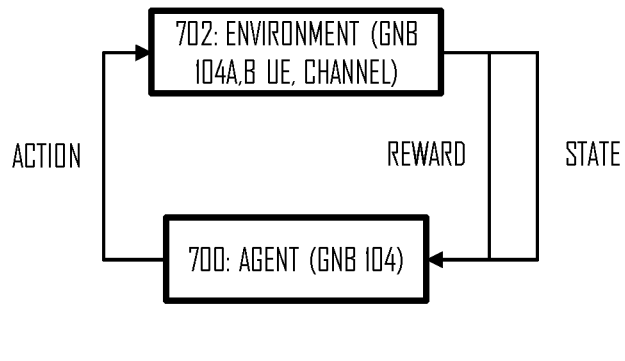
FIG. 7 illustrates operation of a reinforcement learning agent.
Figure 8:
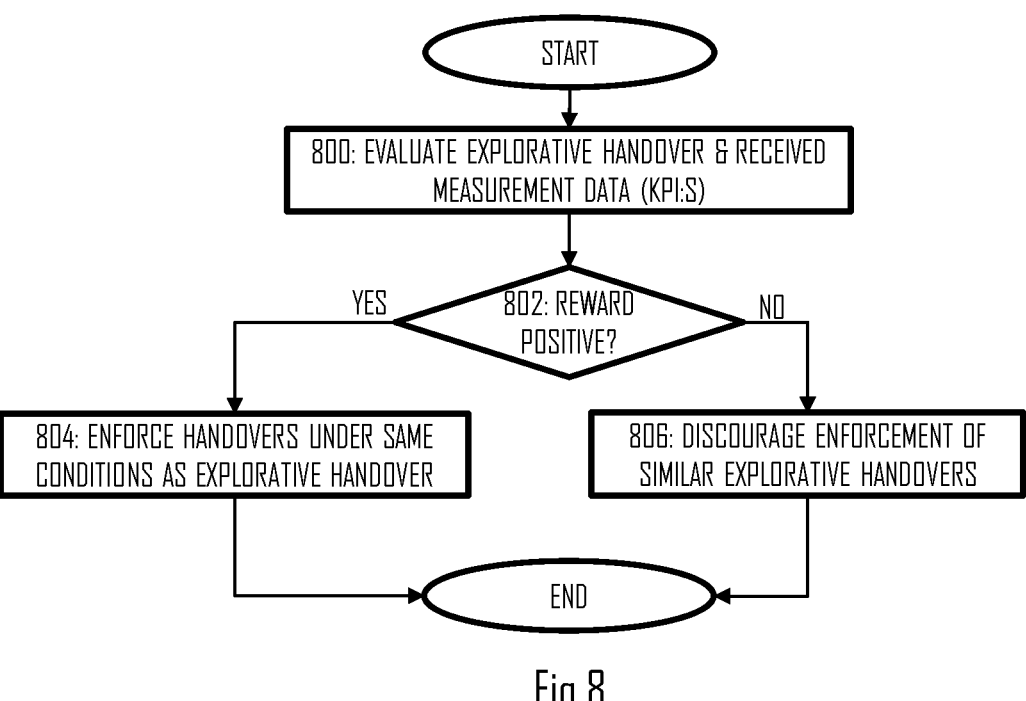
FIG. 8 illustrates a procedure for updating a radio resource management action decision policy according to an embodiment.

As described above, the explorative action may be imple-mented as a part of machine learning in the cellular network. FIG. 7 illustrates a procedure of reinforced learning for an agent 700 performing explorative action (e.g. the network node or gNB 104). The agent interacts with its environment 702 via actions. The actions may include the explorative actions that are actions that may require announcement of the exploration when performed by the agent 700, and exploiting actions that are actions of the currently applied (handover decision) policy that need not to be announced when performed by the agent 700. The environment 702 may comprise the neighbouring network nodes (e.g. the target network node or gNB 104A or 104B), the terminal devices, the radio channels, etc. The actions change the state of the agent and the system, e.g. the explorative handover causes the target network node and the terminal device to reduce the functions for the radio connection subjected to the explorative handover and to perform and report the measurements, etc. The action also changes the performance of the agent and the environment, thus forming a 'reward' that can be represented by the measurement data or KPI(s) reported by the target network node and/or observed or measured by the agent itself. If the measurement data indicates that the performance has improved as a result of an explorative action, the reward is positive or greater/better than with the current handover decision policy. If the mea-surement data indicates that the performance has degraded as a result of the explorative action, the reward is negative or lower than with the current handover decision policy. FIG. 8 illustrates an embodiment of a process executed by the agent, and FIG. 8 may be understood as an embodiment of block 308 or 630.

Referring to FIG. 8, upon receiving the measurement data measured during the explorative handover initiated by the agent, the agent may evaluate the measurement data. As described above, the measurement data may include one or more KPIs. The one or more KPIs may include a signal strength indicator such as a received signal strength indica-tor (RSSI) or a signal-to-interference ratio (SINR), a number of handovers of the explorative radio connection after the explorative handover, appearance of a radio link failure, etc. Although the KPIs are described above in connection with the explorative handover, similar KPI(s) may be determined for the other handovers. On the basis of the evaluation, the agent determines in block 802 whether the one or more KPIs indicate a positive or a negative reward. The determination may be based on comparing the KPI(s) with one or more reference KPI(s), e.g. KPI(s) measured after a conventional handover (not an explorative handover) or KPI(s) measured under 'normal' operation and normal handover(s) of the network node(s) and the terminal device. Upon determining that the reward is positive, the process may proceed to block 804 where the agent enforces the explorative handover. Enforcing an explorative handover may comprise changing one or more parameters or conditions for triggering the handover under the normal operation, thus changing the handover decision policy. However, if the reward is determined to be negative, the agent discourages the explorative handover (block 806). For example, the agent may avoid or reduce the probability of performing the handover again when detecting the same conditions as were present when the explorative handover was triggered. The gNB 104 may store the measurement data received in step 606 for reference.

An example of the positive reward is that the radio connection stays operational until the release, e.g. experiences no radio link failures. Another example of the positive reward is that the reported signal strength indicators remain over a determined threshold. An example of the negative reward is that the explorative radio connection experiences a radio link failure or that the explorative radio connection is subjected to at least a certain number of handovers (e.g. at least one) while the timer is still running in block 621. Another example of the negative reward is that the reported signal strength indicators are below the determined threshold.

Figure 9A:
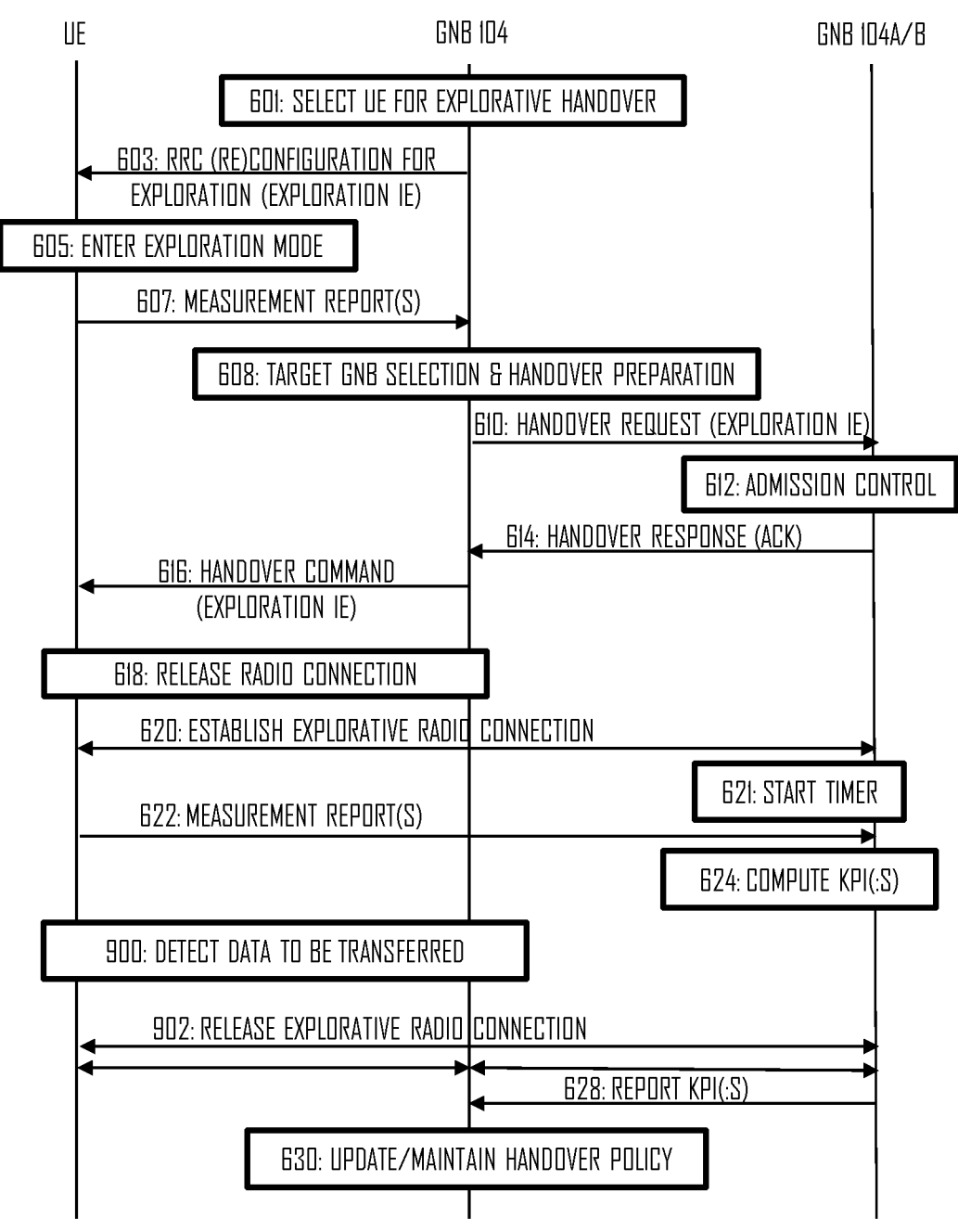
FIG. 9A illustrates a signalling diagram combining the embodiments of FIGS. 3B, 3C and 4B and further illustrating a procedure for cancelling the explorative handover according to an embodiment.

In an embodiment, the explorative handover is cancelled upon detecting a need for data transfer for the terminal device, uplink and/or downlink. FIG. 9A illustrates such an embodiment. In FIG. 9A, the same reference numbers as in FIG. 6 represent the same or substantially similar operations or functions. FIG. 9A follows the embodiments of FIGS. 3B, 3C, and 4B with respect to the selection of the terminal device and associated configuration of the terminal device for the exploration. However, the beginning of the procedure could equally follow the embodiment of FIG. 6.

Referring to FIG. 9A, the gNB 104 selects a terminal device for the explorative handover in block 601. Block 601 may be comprised in block 310. As described above, the terminal device 100 may be selected on the basis of the criterion that the terminal device 100 has no data to transfer. The terminal device may be in a connected state, an inactive state, or in an idle state with respect to the gNB 104. In another embodiment, the terminal device is selected on the basis of detecting a part of the radio access network where training data is needed for the machine learning model training e.g. a problematic cell edge that is experiencing radio link failures. Upon detecting a terminal device in such an area and suitable for the exploration, the terminal device may be selected in block 601. In yet another embodiment, the terminal device is selected randomly to meet a certain target amount of exploration that enables the network node to follow potential changes in the radio access network.

In step 603, the gNB performs a RRC (re)configuration for the terminal device. In an embodiment of step 603 where the terminal device is in an RRC connected state and has established a radio connection with the gNB 104, the gNB 104 may reconfigure the terminal device and the radio connection to the exploration mode. In an embodiment where the terminal device is in the RRC idle mode or has no radio connection with the gNB 104, the gNB may configure the radio connection with the terminal device into the exploration mode. Step 603 may then comprise transmission of a paging message to page the terminal device and, upon receiving a RRC connection request from the terminal device, the gNB 104 may configure the radio connection to the exploration mode. In either embodiment, the (re)configuration performed in step 603 may include transmission of at least one message from the gNB 104 to the terminal device that includes at least one information element indicating that the radio connection is subject to the exploration (exploration IE in FIG. 9A). The information element may be used by the terminal device as a trigger for entering the exploration mode (block 605) and linking the radio connection (re)configured in step 603 to the exploration mode. When the terminal device has associated the radio connection with the exploration mode, the terminal device may maintain the radio connection in the connected state even in a situation where it would normally release the radio connection or switch the radio connection to the inactive state.

As described above, the radio connection subjected to the exploration may comprise the control plane connection without the user plane connection. If step 603 is about the reconfiguration of an existing radio connection comprising both the control plane and user plane, both control plane and user plane may be maintained. In other words, there is no need to release the user plane connection for the purpose of the exploration. On the other hand, if step 603 is about establishing a new radio connection, only the control plane connection may be established, thus reducing signalling.

Upon receiving the RRC (re)configuration message indicating that the terminal device has been selected for the explorative handover, the terminal device may determine whether or not to accept the exploration. For example, if the terminal device has low battery or has another condition that justifies rejection of the exploration request, the terminal device may transmit, as a response to the message received in step 603, a message rejecting the exploration. Thereafter, the procedure may end for the terminal device and the gNB 104 may return to block 601 to select another terminal device. However, let us assume that the terminal device accepts the exploration and proceeds to the exploration mode.

When the radio connection has been configured for the exploration, the terminal device may perform conventional measurements for the purpose of handover, e.g. neighbour cell measurements, acquire measurement data and transmit measurement reports comprising the measurement data to the gNB 104 in step 607. The measurement reports may comprise a received signal strength indicator indicating a strength of a signal received by the terminal device from the gNB 104A and/or 104B. The received signal strength indicator may be a reference signal reception power (RSRP) defined in the 3GPP specifications, for example. The received signal strength indicator may be reported for multiple neighbouring cells in the measurement report(s). On the basis of the measurement report(s), the gNB serving the terminal device may select a target cell for the explorative handover (block 608). In order for the handover decision to be explorative, the gNB 104 may perform the handover decision such that it deviates from the current handover execution policy. For example, the gNB 104 may select, as a target cell of the handover, a cell associated with a lower received signal strength indicator than a lowest limit in the current handover execution policy. Accordingly, the handover may be triggered to a cell indicating a lower connection quality than allowed in the current handover execution policy. From another perspective, if the current handover decision policy defines a selection logic that would result in selecting a certain target cell for the handover, the selection in block 608 may result in selecting a different target cell for the handover. For example, the handover decision policy may specify one or more allowed frequency bands for the target cell, and the handover may be triggered to a target cell operating on another frequency band than allowed by the handover decision policy. In another example, the handover decision policy may specify a maximum delay for executing the handover to a target cell, and the handover may be triggered after expiry of the maximum delay. From here on, the procedure during the explorative handover may follow the embodiment of FIG. 6.

With respect to the embodiment cancelling the exploration upon detecting the need to transfer data, the need for downlink data transmission may be detected by any one or more of the gNBs 104, 104A, 104B by detecting a paging message addressed to the terminal device. In the embodiment of FIG. 9A, upon completing the explorative handover to the target network node in step 620, the gNB 104 may still maintain at least the user plane connection. Thus, the gNB 104 is able to detect if downlink data is received for transmission to the terminal device. Equally, the target network node may detect the need for data transfer by receiving a paging message addressed to the terminal device. The detection of the uplink data to be transmitted may be triggered by initiation of establishment of a new PDU session or upon detection of uplink data in a data buffer, for example. Upon detecting such data in block 900, either by the network node(s) or the terminal device, the entity detecting the data may initiate the release of the explorative radio connection and, as a response, the explorative radio connection is released in step 902. Depending on the conditions where the appearance of the data is detected, the release in step 902 may include certain features.

For example, if the terminal device is operating only the explorative radio connection having the control plane connection but no user plane connection, the radio connection may be released and a new, conventional radio connection may be established for the data transfer. If the terminal device detects the need for data transfer, the terminal device may transmit to a serving network node a message indicating a request to release the explorative radio connection. The network node may then carry out the release (before the timer in block 621 expires) and report the (remaining) measurement data to the gNB 104 (step 628). If the serving network node detects the need for downlink data transfer, the network node may transmit to the terminal device a message indicating the release of the explorative radio connection and, as a response, the network node and the terminal device may carry out the release. If a network node other than the serving network node detects the need for data transfer, it may page the terminal device in a conventional manner. Upon detecting the paging while the explorative radio connection is operational, the terminal device may initiate the release of the explorative radio connection with the serving network node and initiate establishment of a normal radio connection with the paging network node. The new radio connection may be established according to the state-of-the-art, and both a new control plane connection and a new user plane connection may be established and configured to transfer the data.

As another example, if an existing radio connection comprising the control plane connection and the user plane connection was reconfigured to be the explorative radio connection and only the control plane connection was handed over to the target network node, the release may include release of the explorative control plane connection at the target network node and at the terminal device and establishment of a new control plane connection between the source network node (gNB 104) and the terminal device and linking the new control plane connection with the existing user plane connection. Thereafter, the data transfer may be started.

As yet another example, if the data to be transferred is detected after step 602 but before the explorative handover, the explorative handover may be simply cancelled, and the gNB 104 may reconfigure the radio connection as a 'conventional' radio connection by transmitting a RRC reconfiguration message configuring the terminal device to exit the exploration mode for the radio connection and return the radio connection to the normal state. If no user plane connection has been established for the radio connection, the user plane connection may then be established.

As yet another example, if the data to be transferred is detected after step 604 of FIG. 6 but before the explorative handover, or before configuring the explorative handover, the explorative handover may be simply cancelled, and the gNB 104 may reconfigure the radio connection as a 'conventional' radio connection by transmitting a RRC reconfiguration message configuring the terminal device to exit the exploration mode for the radio connection and return the radio connection to the normal state. If no user plane connection has been established for the radio connection, the user plane connection may then be established.

If the data to be transferred is detected while performing the monitoring in block 402, the terminal device may stop the monitoring and establish the necessary connections for the data transfer in a conventional manner. After releasing the connections, the terminal device may resume the monitoring in block 402.

In an embodiment, the terminal device transmits, to the source or serving network node if the explorative handover fails, a radio link failure report comprising an information element indicating that the radio link failure relates to the explorative handover. The radio link failure may occur at various occasions. FIG. 9B illustrates an embodiment where the radio link failure occurs when connecting to the target network node during the explorative handover. Referring to FIG. 9B, after releasing the radio connection with the gNB 104 and in connection with establishment of the explorative radio connection with the target network node 104A/B, the terminal device detects a radio link failure in step 910. The radio link failure may occur in a random access procedure towards the target network node, for example. Upon detecting the radio link failure, the terminal device may generate a radio link failure report and transmit the report to the source network node in step 912. The radio link failure report may include at least one information element indicating that the radio link failure was experienced in the explorative radio connection and/or in the explorative handover. In this embodiment, the terminal device may also indicate specifics of the radio link failure, e.g. that the radio link failure occurred during the random access procedure.

In another embodiment where the radio link failure occurs before the explorative handover has been triggered, steps 910 and 912 may be carried out earlier than illustrated in FIG. 9B. For example, if the terminal device does not receive the handover command in step 616 and, as a result, the explorative radio connection experiences the radio link failure instead of controlled release of the radio connection in step 618, steps 616 and 618 will not be executed in the terminal device and, as a result, steps 910 and 912 will be carried out in the above-described manner. In this embodiment, the terminal device may also indicate specifics of the radio link failure, e.g. that the radio link failure occurred in a situation where the terminal device had configured the exploration mode for the explorative handover but never received a handover command.

In this manner, the source network node or the serving network node may acquire the information on the radio link failure(s) experienced by the terminal device and use the information in the procedure of FIG. 9A or block 630 when determining whether to modify the handover execution policy, as described above. A similar approach applies to the other radio resource management actions where the radio link failure is detected during the exploration.

Figure 10:
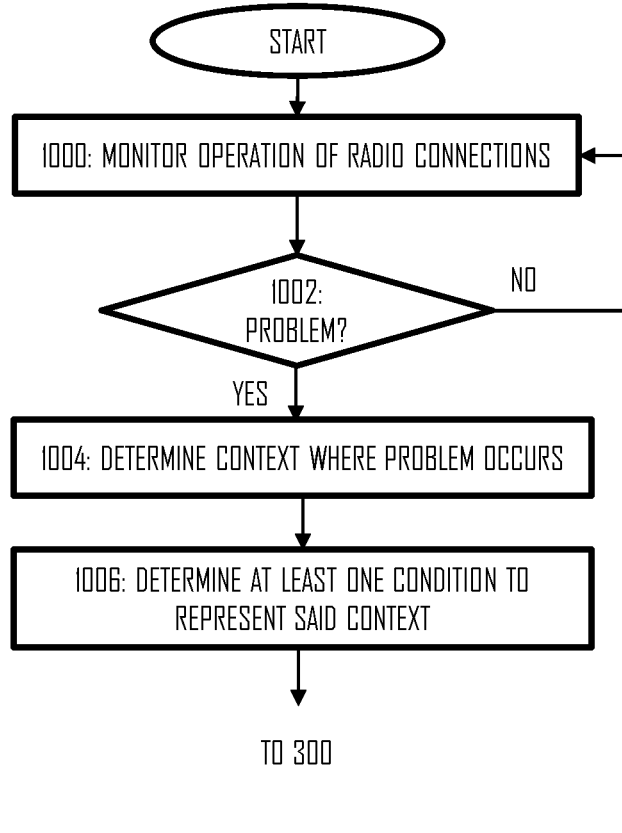
FIG. 10 illustrates a procedure for determining when to perform exploration according to an embodiment.

In an embodiment, the network node determining the perform the exploration (in procedure of FIG. 3A or 3B or in block 600 or 601) detects, while monitoring operation of radio connections of the network node, at least one problem in the execution policy of the radio resource management action, determines a context where the at least one problem occurs, and determines the at least one determined condition to represent the context. FIG. 10 illustrates such an embodiment as a flow diagram. Referring to FIG. 10, the network node may monitor the operation of the radio connections it manages in block 1000, e.g. certain KPIs describing the quality of the radio connections and/or system performance. Upon detecting a problem in the monitored KPIs in block 1002, the network node may determine the context where the problem occurs. For example, if the KPIs include a number of radio link failures, block 1002 may comprise comparison of the number of the radio link failures with a threshold. When the threshold is exceeded, block 1004 may be triggered. Block 1004 may then include determining a context of the detected radio link failures. For example, the network node may determine whether or not the radio link failure is detected in connection with a handover, locations of the radio link failures in the cell, etc. If the network node finds correlation in the context of the detected radio link failures, e.g. that the radio link failures are related to the same target cell or the same area in the edge of the cell managed by the network node, the process may proceed to block 1006 where the network node determines the at least one condition that represents the context. As described above, the at least one condition may define the area in the cell where the problem exists, a time of day when the problem exists, a radio environment where the problem exists, etc. Thereafter, the process may proceed to block 300 to where the at least one condition is transmitted by the network node.

In the description above, the embodiments are described in the context where the exploration is performed for handovers. The exploration may, however, be performed for other radio resource management actions performed in the radio access network, e.g. for link adaptation. FIGS. 11 and 12 illustrate some embodiments for testing explorative RRM actions in the radio access network. The purpose of the testing may be to determine or measure effects of the RRM action, performed through exploration, on performance of the RRC connection subjected to the explorative RRM action and/or to other RRC connections or the system in general. FIG. 11 illustrates a process for a network node (of a radio access network) that manages a cell where a terminal device is camping, e.g. the access node 104 or another network node performing functions of the access node 104 or controlling the access node 104. The network node may manage RRC connections of terminal devices.

Referring to FIG. 11, the process comprises causing transmission (block 1100) of configuration information from the network node, the configuration information configuring a terminal device to establish, in response to the terminal device detecting in a state of not having a need for data transfer that at least one determined condition is met, an explorative connection with the network node; establishing the explorative connection with the terminal device (block 1102), e.g. in response to receiving from the terminal device a request for establishing the explorative connection with the network node; configuring (block 1104) the terminal device to perform an explorative radio resource management action for the explorative connection; after the explorative radio resource management action, acquiring (block 1106) measurement data associated with the explorative radio resource management action; and determining (block 1106), on the basis of the acquired measurement data, whether or not to change an execution policy of the radio resource management action.

In an embodiment where the explorative RRM action requires transfer of data, the explorative connection is configured with the control plane connection and the user plane connection. If the explorative RRM action requires only signalling, for the purpose of performing the measurements, only the control plane connection may be configured.

FIG. 12 illustrates a corresponding process for the terminal device. Referring to FIG. 12, the process comprises as performed by the terminal device: receiving (block 1200) configuration information from a network node of a radio access network; monitoring (block 1200), as configured by the configuration information and in a state of not having a need to transfer data, whether or not at least one determined condition is met; causing, in response to detecting that the at least one determined condition is met, establishment (block 1204) of an explorative connection with the network node; receiving (block 1206) a message from the network node over the explorative connection and performing, in response to the message, an explorative radio resource management action.

In an embodiment, the condition(s) is/are monitored in the above-described manner, e.g. the terminal device may not readily meet the condition(s) when receiving the configuration information but, upon determining to meet the condition(s) thereafter, the terminal device may trigger the establishment of the explorative connection. In another embodiment, the condition check is made upon receiving the configuration information and, if the condition(s) is/are met at that point, the explorative connection is established. In such a case, the condition may include at least a battery status check of the terminal device. If the battery is low, the terminal device may decide that the condition(s) is/are not met. The condition (c) may be specified by the terminal device on its own volition; the exploration may be voluntary to the terminal device. Yet in another embodiment, the configuration of the terminal device may follow the procedure of blocks 601, 603, 605 in FIG. 9B where the terminal device is selected and configured by the network node 104.

Figure 13:
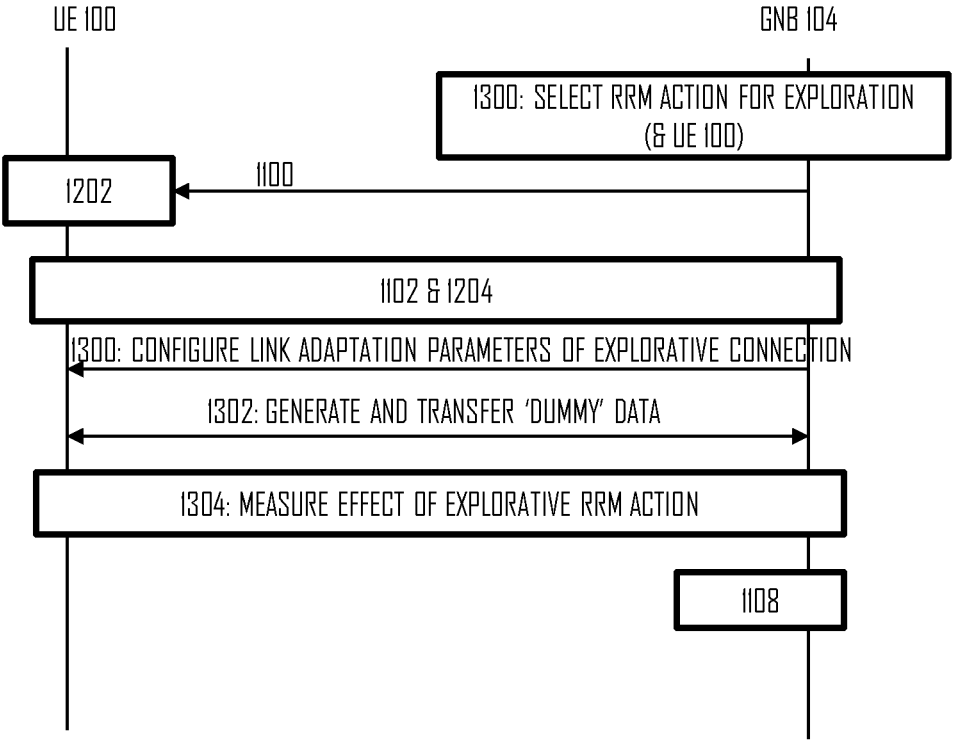
FIG. 13 illustrates a signalling diagram combining the procedures of FIGS. 11 and 12 and illustrating some further embodiments for exploring radio resource management action(s) requiring transfer of data.

As described above, the RRM action may be another RRM action than the handover. FIG. 13 illustrates a procedure where an RRM action requiring data transfer is explored. Referring to FIG. 13, the procedure may start in block 1300 in a manner similar to block 600 or 601 or the procedure of FIG. 10. In other words, the network node may select a RRM action to explore and, optionally, a terminal device 100 with which to perform the exploration. A condition for the selection of the terminal device may be that the terminal device has currently no need for transfer of real payload data, e.g. is in or is entering the idle or inactive state. Upon determining the explore, the network node may transmit the configuration information in block 1100, and the terminal device may perform block 1202 to determine whether or not (or when) to agree with the exploration.

In steps 1102 and 1204, the explorative connection is established between the terminal device and the network node. The explorative connection may include the control plane and the user plane connections. As for the other embodiments, a new explorative connection may be established from the scratch, or an existing connection may be reconfigured as the explorative connection. In step 1300, the network node configures exploration parameters of the RRM action to the terminal device. In this embodiment where the explorative RRM action is the link adaptation, the network node may configure link adaptation parameters to the terminal device in step 1300, such as a modulation and coding scheme (MCS). The message delivering the exploration information may be a scheduling message scheduling also a time-frequency resource (uplink or downlink) to the terminal device.

An error probability of the data transfer is a function of a radio channel quality and MCS. For example, when the channel quality is low, a robust MCS is used to sustain errors. Such error robustness comes with a cost in terms of spectral efficiency. In a better channel, a higher data rate MCS is used. When choosing the MCS, the network node may aim for a certain average error probability that is considered sufficient for the quality-of-service. For example, for mobile broadband traffic, a spectrally efficient error probability target may be around 1 to 10%, while with high-reliability traffic, e.g. ultra-reliable low-latency communications (URLLC), the target may be at 0.01% or even lower, meaning that spectral efficiency is traded to lower reliability and delay. A link adaptation algorithm may aim to choose the most efficient MCS for the given error probability target, and exploring may be used to find the most efficient MCS.

Upon configuring the link adaptation parameters, a data source may generate artificial 'dummy' data and transfer it over the explorative connection with the configured link adaptation parameters (block 1302). In uplink, the data source may be the terminal device. In downlink, the data source may be the network node. A data sink receiving the dummy data may measure one or more KPIs of the link adaptation (block 1304). A KPI may be an error rate of the dummy data. The network node may acquire the measured KPI(s) and use the measurement data in block 1108 to determine whether or not the explored link adaptation parameters provided a positive or negative reward and whether or not to enforce the explored link adaptation parameters.

Steps 1300 to 1304 may be carried out repeatedly before executing block 1108 to gather a sufficient amount of statistics for making the decision. Steps 1300 to 1304 may be carried out with the same link adaptation parameters, or the network node may configure different sets of link adaptation parameters to explore effects of the varying parameters.

Figure 14:
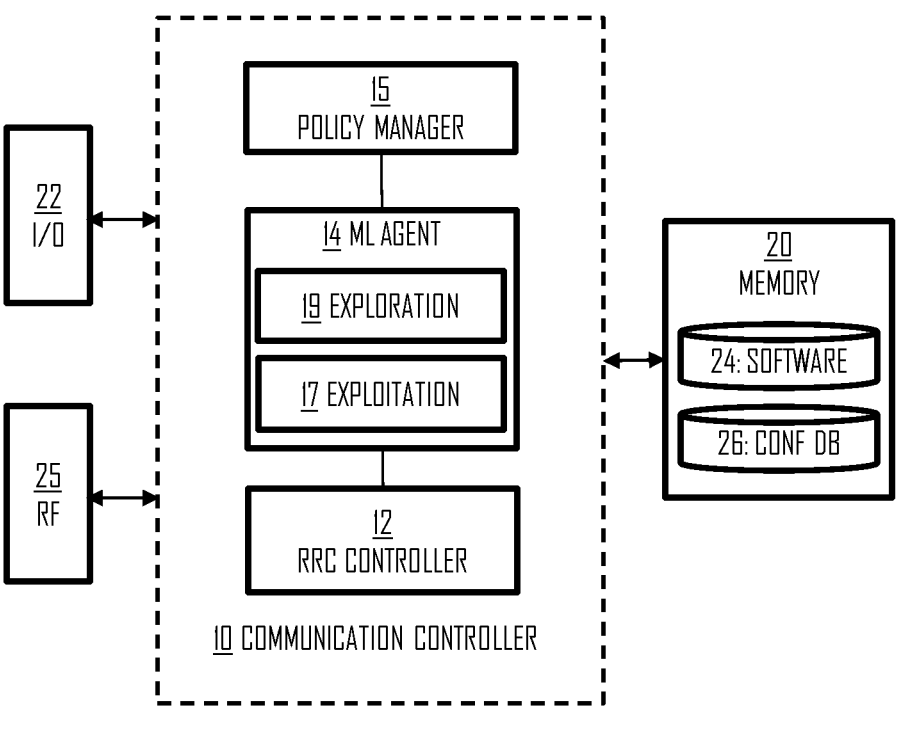
FIGS. 14 and 15 illustrate block diagrams of structures of apparatuses according to some embodiments of the invention.

FIG. 14 illustrates an embodiment of a structure of the above-mentioned functionalities of an apparatus executing the functions of the source network node and/or the target network node in the embodiments described above, e.g. the process of FIG. 3A, 3B, or 3C or any one of embodiments thereof. As described above, the apparatus for the network node may be configured to perform the exploration (when operating as the source network node) and/or to support the exploration performed by another network node (when operating as the target network node). In an embodiment, the apparatus may be a circuitry or an electronic device realizing some embodiments of the invention in the network node. The apparatus carrying out the above-described functionalities may thus be comprised in such a device, e.g. the apparatus may comprise a circuitry such as a chip, a chipset, a processor, a micro controller, or a combination of such circuitries for the network node.

Referring to FIG. 13, the apparatus may comprise a communication controller 10 providing the apparatus with capability of performing the above-described functions of the network node. In some embodiments, the apparatus may comprise a radio interface 25 providing the apparatus with radio communication capability, and the communication controller 10 may employ the radio interface 25. The radio interface 25 may enable establishment of the above-described radio connections with terminal devices served by the network node, e.g. the explorative radio connections. The radio interface 25 may comprise multiple antennas and associated analogue components needed for transmitting and receiving radio signals, e.g. an amplifier, filter, frequency-converter, and an analogue-to-digital converter. The communication controller 10 and/or the radio interface 25 may comprise a radio modem configured to carry out transmission and reception of messages in the cellular network. In some embodiments, the radio interface is used for communicating with the other network nodes.

In some embodiments, the apparatus comprises a second communication interface 22 configured to provide the apparatus with capability of communicating towards the core network 110. In some embodiments, the communication interface 22 may also be used to communicate with the other network nodes via wired connections, e.g. to enable the communication between the network node in steps 610, 614, and 628. In the context of 5G networks, the communication interface 22 may be configured to communication over an Xn interface, F1 interface, and/or an NG interface.

The communication controller 10 may comprise at least one processor or a processing circuitry. The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store a configuration database 26 storing operational configurations of the apparatus. The configuration database 26 may, for example, store the rules for performing the exploration in the above-described manner. The memory 20 may further store a database defining the current handover decision policy applied by the network node.

The communication controller may comprise an RRC controller 12 configured to establish, manage, and terminate radio connections between the network node and the terminal devices connected to the network node. The RRC controller 12 may operate under a control of RRC functions that make the decisions of RRC actions such as the handovers. The communication controller 10 may further comprise a machine learning agent 14 performing handover decisions and exploring modifications to the current handover decision policy by exploring new handover conditions or handover parameters, as described above. The ML agent 14 may comprise an exploration agent 19 and an exploitation agent 17. The ML agent 14 may enable only one of the exploration agent and the exploitation agent at a time for an individual radio connection. When the network node manages multiple radio connections of various terminal devices, the exploitation agent may manage a subset of the radio connections while the exploration agent manages the other radio connections. The exploration agent may operate in an exploration mode where the exploration agent may carry out explorative handovers of explorative radio connections in the above-described manner, receive the measurement data from the neighbouring network nodes and analyse the measurement data in order to determine whether or not the explorative actions improved the performance. Upon detecting that the one or more explorative handovers improving the performance have been discovered during the exploration, the exploration agent 19 may output the information on the one or more explorative handovers and corresponding performance improvement, and the ML agent may then decide whether or not to modify the handover decision policy such that handovers are triggered in the same conditions as where the explorative handover(s) was/were triggered and update the database 26, if the handover decision policy is changed. The exploitation agent 17 may operate the handovers according to the current handover decision policy, as defined in the configuration database 26. As described above, the ML agent may control a given radio connection with the exploration agent 19 or with the exploitation agent 17. When controlling the radio connection with the exploitation agent 17, the ML agent may be limited to the handover decision policy. When controlling the radio connection with the exploration agent 19, the ML agent may perform the explorative handovers by triggering a handover in a situation where the handover decision policy would not trigger a handover.

The apparatus may employ other ML agents that in parallel control the radio connections by using different RRC functions (power control, link management etc.). An explorative action (or even an exploitation action) performed by the ML agent 14 may affect another ML agent in a positive or negative manner. For example, a change to the handover decision policy may induce a change in the conditions of a transmit power control, for example. In order to enable efficient cooperation of the different ML agents, a policy manager 15 may monitor the exploration and generally the operation of the ML agent 14. The policy manager may, for example, enable or disable exploration in the ML agent 14, enforce or discourage certain policies, etc.

Figure 15:
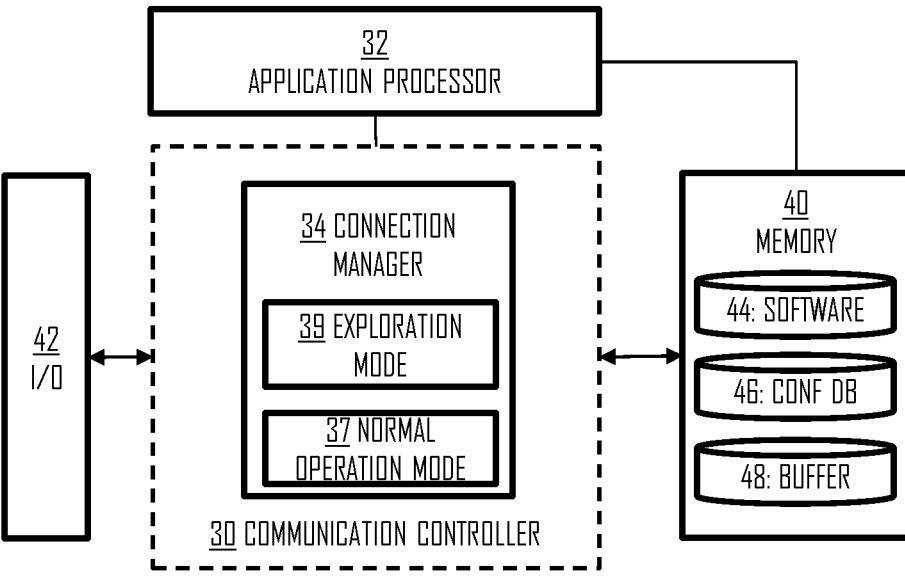

FIG. 15 illustrates an apparatus comprising a processing circuitry, such as at least one processor, and at least one memory 40 including a computer program code (software) 44, wherein the at least one memory and the computer program code (software) are configured, with the at least one processor, to cause the apparatus to carry out the process of FIG. 4A or 4B or any one of its embodiments described above. The apparatus may be for the terminal device. The apparatus may be a circuitry or an electronic device realizing some embodiments of the invention in the terminal device. The apparatus carrying out the above-described functionalities may thus be comprised in such a device, e.g. the apparatus may comprise a circuitry such as a chip, a chipset, a processor, a micro controller, or a combination of such circuitries for the terminal device. The processing circuitry may realize a communication controller 30 controlling communications with the cellular network infrastructure in the above-described manner. The communication controller may be configured to establish and manage radio connections and transfer of data over the radio connections.

The communication controller may comprise a connection manager 34 configured to manage radio connections in the terminal device. As described above, the connection manager may employ the exploration mode 39 where the terminal device enables a reduced set of RRC functions for a radio connection and, additionally, the terminal device may employ a normal operation mode 37 where the full set of RRC functions are available to a radio connection. As described above, a radio connection established in or switched to the exploration mode may be without a user plane connection. The exploration mode may define also certain actions or parameters for managing the radio connections. For example, upon detecting a radio link failure in a radio connection in the exploration mode, the terminal device may report that the radio link failure was experienced specifically in the exploration mode.

Referring to FIG. 15, the memory 40 may be implemented using any suitable data storage technology, such as semiconductor-based memory devices, flash memory, magnetic memory devices and systems, optical memory devices and systems, fixed memory and removable memory. The memory 40 may comprise a configuration database 46 for storing configuration parameters, e.g. the configurations for the exploration mode and the normal operation mode 37, 39. The memory 40 may further store a data buffer 48 for uplink data to be transmitted from the apparatus.

The apparatus may further comprise a communication interface 42 comprising hardware and/or software for providing the apparatus with radio communication capability with one or more access nodes, as described above. The communication interface 42. The communication interface 42 may comprise hardware and software needed for realizing the radio communications over the radio interface, e.g. according to specifications of an LTE or 5G radio interface.

The apparatus may further comprise an application processor 32 executing one or more computer program applications that generate a need to transmit and/or receive data through the communication controller 30. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 3A to 4B or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

What is claimed is:

1. An apparatus for a source network node of a radio access network, comprising:

at least one processor; and at least one non-transitory memory storing instructions that, when executed with the at least one processor, cause the apparatus to:

monitor one or more Key Performance Indicators (KPIs) of radio connections managed by the source network node;

compare the one or more KPIs to a threshold;

based on the comparison, detect: a handover problem in a predefined area of a cell managed by the source network node, an outage in the cell, or a need to modify a handover execution policy of the source network node;

based on the detection, determine to perform an explorative handover;

in response to determining to perform the explorative handover, transmit, within a Radio Resource Control (RRC) release message to a terminal device, configuration information to configure the terminal device to enter, in a state of not having a need to transfer data, an exploration mode, wherein the configuration information comprises: a location of the terminal device, a range of a parameter measured by the terminal device, a time of day, and a parameter indicative of a received signal strength measured by the terminal device;

in response to the terminal device entering the exploration mode, establish a first explorative radio connection with the terminal device, wherein the first explorative radio connection comprises a control plane connection without a user plane connection and operates with a reduced set of radio connection functions compared to a default operating mode;

receive from the terminal device, via the first explorative radio connection, one or more measurement reports of one or more neighboring cells of the cell, wherein the one or more measurement reports comprise Reference Signal Reception Power (RSRP) of the one or more neighboring cells;

based on the one or more received measurement reports, determine, from the one or more neighboring cells, a target cell corresponding to a target network node for the explorative handover, wherein determining the target cell deviates from the handover execution policy by selecting the target cell associated with an RSRP value, indicated in the one or more measurement reports, that is lower than a minimum threshold defined in the handover execution policy;

transmit, to the target network node, a handover request comprising information indicating the explorative handover;

in response to transmitting the handover request, receive, from the target network node, a handover response message accepting the explorative handover;

in response to the handover response message:

transmit, to the terminal device, a handover command to configure the terminal device to perform the explorative handover to the target network node; and release the first explorative radio connection with the terminal device;

after the explorative handover, receive, from the target network node, measurement data associated with a second explorative radio connection established between the terminal device and the target network node as a result of the explorative handover; and based on the received measurement data indicating that a performance of the second explorative radio connection exceeds a performance threshold defined by the handover execution policy, to modify the handover execution policy of the source network node to include conditions corresponding to the explorative handover.

2. The apparatus of claim 1, wherein the state of not having the need to transfer the data is an idle state or an inactive state, and wherein the configuration information for the terminal device to enter the exploration mode is different for the idle state than for the inactive state.

3. The apparatus of claim 1, wherein the instructions, when executed with the at least one processor, further cause the apparatus to cancel the explorative handover upon detecting a paging message addressed to the terminal device.

4. The apparatus of claim 1, wherein the information indicating the explorative handover, to the target network node, indicates that;

the second explorative radio connection of the terminal device with the target network node shall be released after the explorative handover; and the target network node shall transmit the measurement data to the source network node.

5. The apparatus of claim 1, wherein the instructions, when executed with the at least one processor, further cause the apparatus to receive, from the terminal device in response to a failure of the explorative handover, a radio link failure report comprising an information element indicating that the radio link failure relates to the explorative handover.

6. An apparatus for a terminal device, comprising:

at least one processor; and at least one non-transitory memory storing instructions that, when executed with the at least one processor, cause the apparatus to:

receive, from a source network node of a radio access network within a Radio Resource Control (RRC) release message, configuration information for entering, in a state of not having a need to transfer data, an exploration mode, wherein the configuration information comprises at least one condition for the terminal device to enter the exploration mode, wherein the at least one condition comprises: a location of the terminal device, a threshold or a range of a parameter measured by the terminal device, a time of day, and a parameter indicative of a received signal strength measured by the terminal device;

based on the received configuration information, enter the exploration mode;

establish, in the exploration mode, a first explorative radio connection with the source network node, wherein the first explorative radio connection comprises a control plane connection without a user plane connection and operates with a reduced set of radio connection functions compared to a default operating mode;

measure one or more parameters of one or more neighboring cells of a cell managed by the source network node, the parameters comprising at least a Reference Signal Reception Power (RSRP);

transmit, to the source network node via the first explorative radio connection, one or more measurement reports comprising the measured parameters of the one or more neighboring cells;

receive, via the first explorative radio connection from the source network node, a handover request identifying a target network node and instructing the apparatus to perform an explorative handover to the target network node;

in response to the handover request, release the first explorative radio connection with the source network node;

establish a second explorative radio connection with the target network node as a result of the explorative handover;

acquire measurement data of the second explorative radio connection; and transmit, to the target network node, the measurement data.

7. The apparatus of claim 6, wherein the instructions, when executed with the at least one processor, further cause the apparatus to transmit, to the source network node in response to a failure of the explorative handover, a radio link failure report comprising an information element indicating that the radio link failure relates to the explorative handover.

* * * * *